US012647059B2

(12) United States Patent
Morino et al.

(10) Patent No.: US 12,647,059 B2
(45) Date of Patent: Jun. 2, 2026

(54) MULTI-PHASE MOTOR SWITCHING DEVICE AND MULTI-PHASE MOTOR

(71) Applicants:AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shintaro Morino, Osaka (JP); Kanzo Ishihara, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 266 days.

(21) Appl. No.: 18/558,034

(22) PCT Filed: Apr. 28, 2022

(86) PCT No.: PCT/JP2022/019382
§ 371 (c)(1),
(2) Date: Oct. 30, 2023

(87) PCT Pub. No.: WO2022/234826
PCT Pub. Date: Nov. 10, 2022

(65) Prior Publication Data
US 2024/0291413 A1 Aug. 29, 2024

(30) Foreign Application Priority Data

May 7, 2021 (JP) ................................. 2021-078883
Feb. 9, 2022 (JP) ................................. 2022-018894

(51) Int. Cl.
H02P 25/18 (2006.01)
H02K 3/28 (2006.01)
H02K 3/50 (2006.01)

(52) U.S. Cl.
CPC ............. H02P 25/188 (2013.01); H02K 3/28 (2013.01); H02K 3/50 (2013.01); *H02K 2203/09* (2013.01)

(58) Field of Classification Search
CPC .......... H02P 25/188; H02K 3/28; H02K 3/50; H02K 2203/09
See application file for complete search history.

(56) References Cited

U.S. PATENT DOCUMENTS

2017/0331342 A1* 11/2017 Beetz ................... H01R 4/2429
2020/0373819 A1* 11/2020 Williams ................. H02K 3/28
(Continued)

FOREIGN PATENT DOCUMENTS

JP      2001-086721 A      3/2001
JP      2003-018879 A      1/2003
(Continued)

OTHER PUBLICATIONS

Translation of JP2008160920 has been attached.*
International Search Report, Application No. PCT/JP2022/019382, mailed Jul. 26, 2022. ISA/Japan Patent Office.

*Primary Examiner* — Zoheb S Imtiaz
(74) *Attorney, Agent, or Firm* — Brooks Kushman P.C

(57) ABSTRACT

Provided is a multi-phase motor switching device capable of switching a plurality of coil parts constituting the phase coils of a multi-phase motor between a series connection and a parallel connection. A multi-phase motor switching device is used in a multi-phase motor provided with a first-phase coil, a second-phase coil, and a third-phase coil. The multi-phase motor switching device includes: a first switching unit configured to switch a plurality of first coil parts constituting (Continued)

the first-phase coil between a series connection and a parallel connection; a second switching unit configured to switch a plurality of second coil parts constituting the second-phase coil between a series connection and a parallel connection; a third switching unit configured to switch a plurality of third coil parts constituting the third-phase coil between a series connection and a parallel connection.

15 Claims, 18 Drawing Sheets

(56)                References Cited

U.S. PATENT DOCUMENTS

| 2021/0057951 | A1* | 2/2021 | Dosch | H02K 3/522 |
| 2022/0190770 | A1* | 6/2022 | Ritchey | H02K 1/278 |
| 2023/0283214 | A1* | 9/2023 | Jeong | H02P 25/18 |

FOREIGN PATENT DOCUMENTS

| JP | 2008-160920 | A | 7/2008 |
| JP | 2008160920 | * | 7/2008 |
| JP | 2013-219913 | A | 10/2013 |
| JP | 2020-043740 | A | 3/2020 |

* cited by examiner

ONE SIDE IN AXIAL DIRECTION

THE OTHER SIDE IN AXIAL DIRECTION

FIG. 5A                                    FIG. 5B

Torque                                     Torque

Rotation speed                             Rotation speed

Legend
A: coil wire part
B: connection state

|  | Coil wire part switching |  |  |  |  | Series/parallel switching |  |
|---|---|---|---|---|---|---|---|
|  | First A | Second A | Third A | Connection state | A's to be energized | First A | Second A |
| First state | Shorted state | Canceled state | Canceled state | First connection state | First coil wire part | Series | Series |
| Second state | Shorted state | Canceled state | Canceled state | First connection state | First coil wire part | Series | Parallel |
| Third state | Shorted state | Canceled state | Canceled state | First connection state | Second coil wire part | Parallel | Series |
| Fourth state | Shorted state | Canceled state | Canceled state | First connection state | Second coil wire part | Parallel | Parallel |
| Fifth state | Shorted state | Canceled state | Shorted state | Second connection state | First A | Series | No current flows |
| Sixth state | Shorted state | Canceled state | Shorted state | Second connection state | First A | Parallel | No current flows |
| Seventh state | Canceled state | Shorted state | Canceled state | Third connection state | Second A | No current flows | Series |
| Eighth state | Canceled state | Shorted state | Canceled state | Third connection state | Second A | No current flows | Parallel |
| Ninth state | Canceled state | Canceled state | Canceled state | Fourth B | None | No current flows | No current flows |

MULTI-PHASE MOTOR SWITCHING DEVICE AND MULTI-PHASE MOTOR

CROSS-REFERENCE TO RELATED APPLICATIONS

This application is the U.S. national stage of PCT/JP2022/019382 filed on Apr. 28, 2022, which claims priority of Japanese Patent Application No. JP 2021-078883 filed on May 7, 2021, and Japanese Patent Application No. JP 2022-018894, filed on Feb. 9, 2022, the contents of which are incorporated herein.

TECHNICAL FIELD

The present disclosure relates to a multi-phase motor switching device and a multi-phase motor.

BACKGROUND

A stator of a rotating electrical machine disclosed in JP 2013-219913A includes a stator core, and toroidal coils (including a U-phase toroidal coil, a V-phase toroidal coil, and a W-phase toroidal coil). The U-phase toroidal coil has a configuration in which a plurality of U-phase coils are connected in series to each other. The V-phase toroidal coil has a configuration in which a plurality of V-phase coils are connected in series to each other. The W-phase toroidal coil has a configuration in which a plurality of W-phase coils are connected in series to each other.

The phase coils provided in a stator of a multi-phase motor typically have a configuration in which, for example, a plurality of coils are connected in series to each other as in the stator of the rotating electrical machine disclosed in JP 2013-219913A. However, no additional innovations have been made for such phase coils.

It is an object of the present disclosure to switch a plurality of coil parts constituting the phase coils of a multi-phase motor between a series connection and a parallel connection.

SUMMARY

According to one aspect of the present disclosure, a multi-phase motor switching device for use in a multi-phase motor, the multi-phase motor being provided with multi-phase coils each including a plurality of coil parts, includes a switching unit configured to switch at least some of the plurality of coil parts of each of the multi-phase coils between a series connection and a parallel connection.

According to one aspect of the present disclosure, a multi-phase motor includes the above-described multi-phase motor switching device.

Advantageous Effects

According to the present disclosure, it is possible to switch a plurality of coil parts constituting the phase coils of a multi-phase motor between a series connection and a parallel connection.

BRIEF DESCRIPTION OF DRAWINGS

FIG. 8 illustrates how the states of the switching device of FIG. 6 correspond to coil wire part switching and series/parallel switching.

DETAILED DESCRIPTION OF PREFERRED EMBODIMENTS

Figure 1:
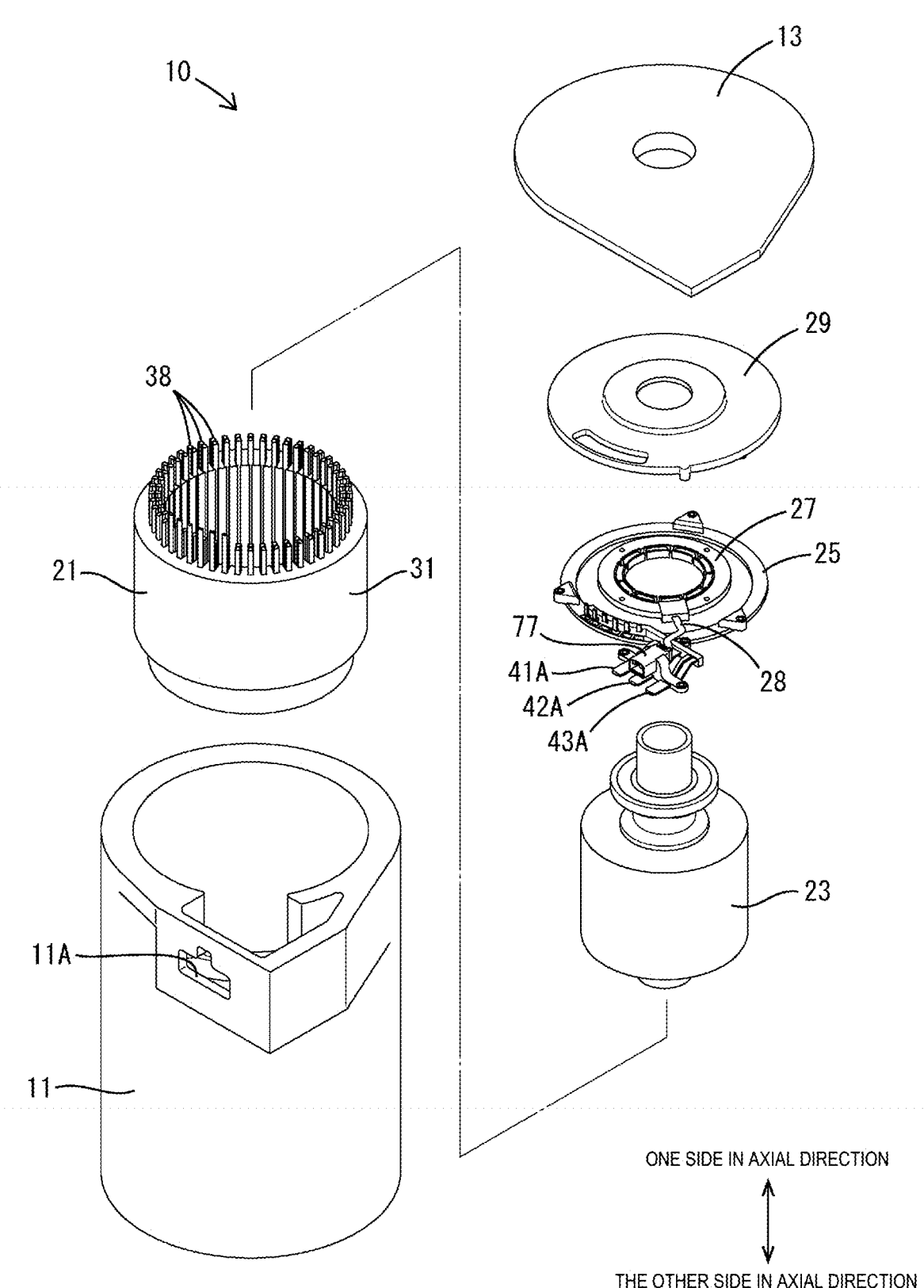
FIG. 1 is an exploded perspective view illustrating a motor according to a first embodiment of the present disclosure.

Hereinafter, embodiments of the present disclosure will be listed and described. Note that the features exemplified below may be combined in a suitable manner to the extent that they are not inconsistent with each other.

A multi-phase motor switching device for use in a multi-phase motor provided with multi-phase coils, the multi-phase coils each including a plurality of coil parts, the multi-phase motor switching device includes a switching unit configured to switch at least some of the plurality of coil parts of each of the multi-phase coils between a series connection and a parallel connection.

The multi-phase motor switching device can switch, using the switching unit, a plurality of coil parts constituting the phase coils of the multi-phase motor between a series connection and a parallel connection.

In the multi-phase motor switching device according to the present disclosure, the multi-phase coils may include a first-phase coil, a second-phase coil, and a third-phase coil, and the switching unit may include: a first switching unit configured to switch a plurality of first coil parts constituting the first-phase coil between a series connection and a parallel connection; a second switching unit configured to switch a plurality of second coil parts constituting the second-phase coil between a series connection and a parallel connection; a third switching unit configured to switch a plurality of third coil parts constituting the third-phase coil between a series connection and a parallel connection.

In the multi-phase motor switching device, the first switching unit can switch the plurality of first coil parts constituting the first-phase coil between a series connection and a parallel connection, the second switching unit can switch the plurality of second coil parts constituting the second-phase coil between a series connection and a parallel connection, and the third switching unit can switch a plurality of third coil parts constituting the third-phase coil between a series connection and a parallel connection. Accordingly, the multi-phase motor switching device can switch the plurality of coil parts constituting the phase coils between a series connection and a parallel connection.

The multi-phase motor switching device according to the present disclosure may further include a holding unit that holds the first switching unit, the second switching unit, and the third switching unit. The holding unit may be configured to be fixed to a stator unit of the multi-phase motor.

With this configuration in which the first switching unit, the second switching unit, and the third switching unit are held by the holding unit, a simplified configuration can be realized compared to a configuration in which switching units are respectively held by different members. Furthermore, a configuration is realized in which the holding unit is fixed to the stator unit of the multi-phase motor, making it possible to eliminate a configuration of holding the switching units between the holding unit and the stator unit.

In the multi-phase motor switching device according to the present disclosure, the first switching unit may include a plurality of first relays, and may be configured to turn the plurality of first relays on and off to switch the plurality of first coil parts between a series connection and a parallel connection. The second switching unit may include a plurality of second relays, and may be configured to turn the plurality of second relays on and off to switch the plurality of second coil parts between a series connection and a parallel connection. The third switching unit may include a plurality of third relays, and may be configured to turn the plurality of third relays on and off to switch the plurality of third coil parts between a series connection and a parallel connection. The first relays, the second relays, and the third relays may be configured as semiconductor relays.

With this configuration, since the plurality of relays of the switching units are configured as semiconductor relays, a compact configuration can be achieved compared to a case where the relays are configured as mechanical relays.

In the multi-phase motor switching device according to the present disclosure, the first switching unit may include a plurality of first relays, and is configured to turn the plurality of first relays on and off to switch the plurality of first coil parts between a series connection and a parallel connection. The second switching unit includes a plurality of second relays, and is configured to turn the plurality of second relays on and off to switch the plurality of second coil parts between a series connection and a parallel connection. The third switching unit includes a plurality of third relays, and is configured to turn the plurality of third relays on and off to switch the plurality of third coil parts between a series connection and a parallel connection. The first relays, the second relays, and the third relays are configured as mechanical relays.

With this configuration, since the plurality of relays of the switching units are configured as mechanical relays, loss due to resistance can be reduced compared to a case where the relays are configured as semiconductor relays.

The multi-phase motor switching device according to the present disclosure may further include a terminal holding unit that holds a plurality of power terminals respectively electrically connected to the first-phase coil, the second-phase coil, and the third-phase coil, the terminal holding unit containing an insulating material. The first switching unit, the second switching unit, the third switching unit, and the terminal holding unit may be formed as one piece.

With this configuration, the multi-phase motor switching device may function as a structure of holding power terminals.

The multi-phase motor switching device according to the present disclosure may be used in the multi-phase motor in which a stator core, the first-phase coil, the second-phase coil, and the third-phase coil are provided in the stator unit. The multi-phase motor switching device may further comprise a cover part containing an insulating material, the cover part being configured to cover and hold together a plurality of coil ends of the first-phase coil, the second-phase coil, and the third-phase coil that protrude from an end of the stator core, and defining a positional relationship between the coil ends. The cover part, the first switching unit, the second switching unit, the third switching unit, and the terminal holding unit may be formed as one piece.

With this configuration, the cover part can be attached to a bundle of the coil ends, making it possible to ensure the insulation properties of the plurality of coil ends.

In the multi-phase motor switching device according to the present disclosure, the multi-phase coils may each include a plurality of coil wire parts, the multi-phase motor switching device may further include a connection switching unit configured to switch a connection state of the plurality of coil wire parts of each multi-phase coil, the coil wire parts of each multi-phase coil may include a first coil wire part and a second coil wire part, and the connection switching unit may be switched between a first connection state in which current flow control of the first coil wire part and the second coil wire part of the multi-phase coil is possible, a second connection state in which current flow control of the first coil wire part of the multi-phase coil is possible and current flow control of the second coil wire part of the multi-phase coil is interrupted, and a third connection state in which current flow control of the second coil wire part of the multi-phase coil is possible and current flow control of the first coil wire part of the multi-phase coil is interrupted.

With this configuration, since the second connection state is an operation pattern in which the first coil wire parts of the phase coils are selectively used and the second coil wire parts are selectively not used, and the third connection state is an operation pattern in which the second coil wire parts of the phase coils are selectively used and the first coil wire parts are selectively not used, the switching device can generate the operation pattern in which the first coil wire parts are used while suppressing the effects of the second coil wire parts, and the operation pattern in which the second coil wire parts are used while suppressing the effects of the first coil wire parts. Furthermore, since the switching device can also generate, in the first connection state, an operation pattern in which both the first coil wire parts and the second coil wire parts are used, it is possible to increase the number of operation patterns of the multi-phase motor.

The multi-phase motor switching device according to the present disclosure may further include a control unit configured to control the connection switching unit, wherein the multi-phase coils include a first-phase coil, a second-phase coil, and a third-phase coil, the connection switching unit includes a first connection switching unit configured to be switched between a first shorted state and a first canceled state, a second connection switching unit configured to be switched between a second shorted state and a second canceled state, and a third connection switching unit configured to be switched between a third shorted state and a third canceled state, the first shorted state is a state in which a first end, which is one end of the first coil wire part of the first-phase coil, and a first conductive path are shorted, a second end, which is one end of the first coil wire part of the second-phase coil, and a second conductive path are shorted, and a third end, which is one end of the first coil wire part of the third-phase coil, and a third conductive path are shorted, the first canceled state is a state in which a short-circuit between the first end and the first conductive path is canceled, a short-circuit between the second end and the second conductive path is canceled, and a short-circuit between the third end and the third conductive path is canceled, the second shorted state is a state in which a fourth end, which is one end of the second coil wire part of the first-phase coil, and the first conductive path are shorted, a fifth end, which is one end of the second coil wire part of the second-phase coil, and the second conductive path are shorted, and a sixth end, which is one end of the second coil wire part of the third-phase coil, and the third conductive path are shorted, the second canceled state is a state in which a short-circuit between the fourth end and the first conductive path is canceled, a short-circuit between the fifth end and the second conductive path is canceled, and a short-circuit between the sixth end and the third conductive path is canceled, the third shorted state is a state in which ends of another end group are shorted to each other, the other end group including another end of the first coil wire part of the first-phase coil, another end of the first coil wire part of the second-phase coil, and another end of the first coil wire part of the third-phase coil, the third canceled state is a state in which short-circuits between the ends of the other end group are canceled, and the control unit controls the connection switching unit to be in the first connection state by bringing the first connection switching unit into the first shorted state, the second connection switching unit into the second canceled state, and the third connection switching unit into the third canceled state, controls the connection switching unit to be in the second connection state by bringing the first connection switching unit into the first shorted state, the second connection switching unit into the second canceled state, and the third connection switching unit into the third shorted state, and controls the connection switching unit to be in the third connection state by bringing the first connection switching unit into the first canceled state, the second connection switching unit into the second shorted state, and the third connection switching unit into the third canceled state.

With this configuration, using a simple method of changing the combination of a shorted state and a canceled state of the connection switching units, it is possible to switch between at least three connection states (namely, the first connection state, the second connection state, and the third connection state) of the multi-phase motor.

In the multi-phase motor switching device according to the present disclosure, the first coil wire part and the second coil wire part of each of the multi-phase coils may be constituted by the plurality of coil parts, the switching unit may be configured to switch the plurality of coil parts constituting the first coil wire part between a series connection and a parallel connection, and switch the plurality of coil parts constituting the second coil wire part between a series connection and a parallel connection, in each of the multi-phase coils, when the plurality of coil parts constituting the first coil wire part are switched by the switching unit to a series connection, and the plurality of coil parts constituting the second coil wire part are switched by the switching unit to a series connection, a combined inductance of the first coil wire part may be greater than a combined inductance of the second coil wire part, and in each of the multi-phase coils, when the plurality of coil parts constituting the first coil wire part are switched to a parallel connection, and the plurality of coil parts constituting the second coil wire part are switched to a parallel connection, a combined inductance of the first coil wire part may be greater than a combined inductance of the second coil wire part.

With this configuration, in a state in which the plurality of coil parts of the first coil wire parts are connected in series to each other, and the plurality of coil parts of the second coil wire parts are connected in series to each other, since the first coil wire parts whose combined inductance is relatively large can be selectively used in the second connection state, a large torque can be generated. On the other hand, in the third connection state, the second coil wire parts whose combined inductance is relatively small can be selectively used, and thus it is likely to enhance the suitability for high-speed driving. In the first connection state, not only the first coil wire parts whose combined inductance is relatively large but also the second coil wire parts can be used, and thus it is likely to further increase the torque.

In a state in which the plurality of coil parts of the first coil wire parts are connected in parallel to each other, and the plurality of coil parts of the second coil wire parts are connected in parallel to each other, the first coil wire parts whose combined inductance is relatively large can be selectively used in the second connection state, and thus a large torque can be generated. On the other hand, in the third connection state, the second coil wire parts whose combined inductance is relatively small can be selectively used, and thus it is likely to enhance the suitability for high-speed driving. In the first connection state, not only the first coil wire parts whose combined inductance is relatively large but also the second coil wire parts can be used, and thus it is likely to further increase the torque.

A multi-phase motor according to the present disclosure includes the multi-phase motor switching device according to any one of the above features.

First Embodiment

Configuration of Motor

A motor 10 of a first embodiment is a multi-phase motor that uses a polyphase alternating current source. As shown in FIG. 1, the motor 10 includes a housing 11, an end cover 13, a stator unit 21, a rotor unit 23, a coupling connector 25, a rotation angle sensor 27, and a flange 29. The "multi-phase motor switching device" of the present disclosure refers to a switching device (see the switching device 1 in FIG. 4) for use in the motor 10, and is applied to the coupling connector 25 by way of example.

The housing 11 has the shape of a bottomed tube with an opening at an end in an axial direction. The end cover 13 is attached to the housing 11 so as to close the opening of the housing 11. The housing 11 houses the stator unit 21, the rotor unit 23, the coupling connector 25, the rotation angle sensor 27, and the flange 29. The housing 11 has a connection opening 11A from which power terminals 41A, 42A, and 43A and a socket 77 of the later-described coupling connector 25 are exposed. The rotation angle sensor 27 is connected to the coupling connector 25 via a sensor connector 28.

Configuration of Stator Unit

Figure 2:
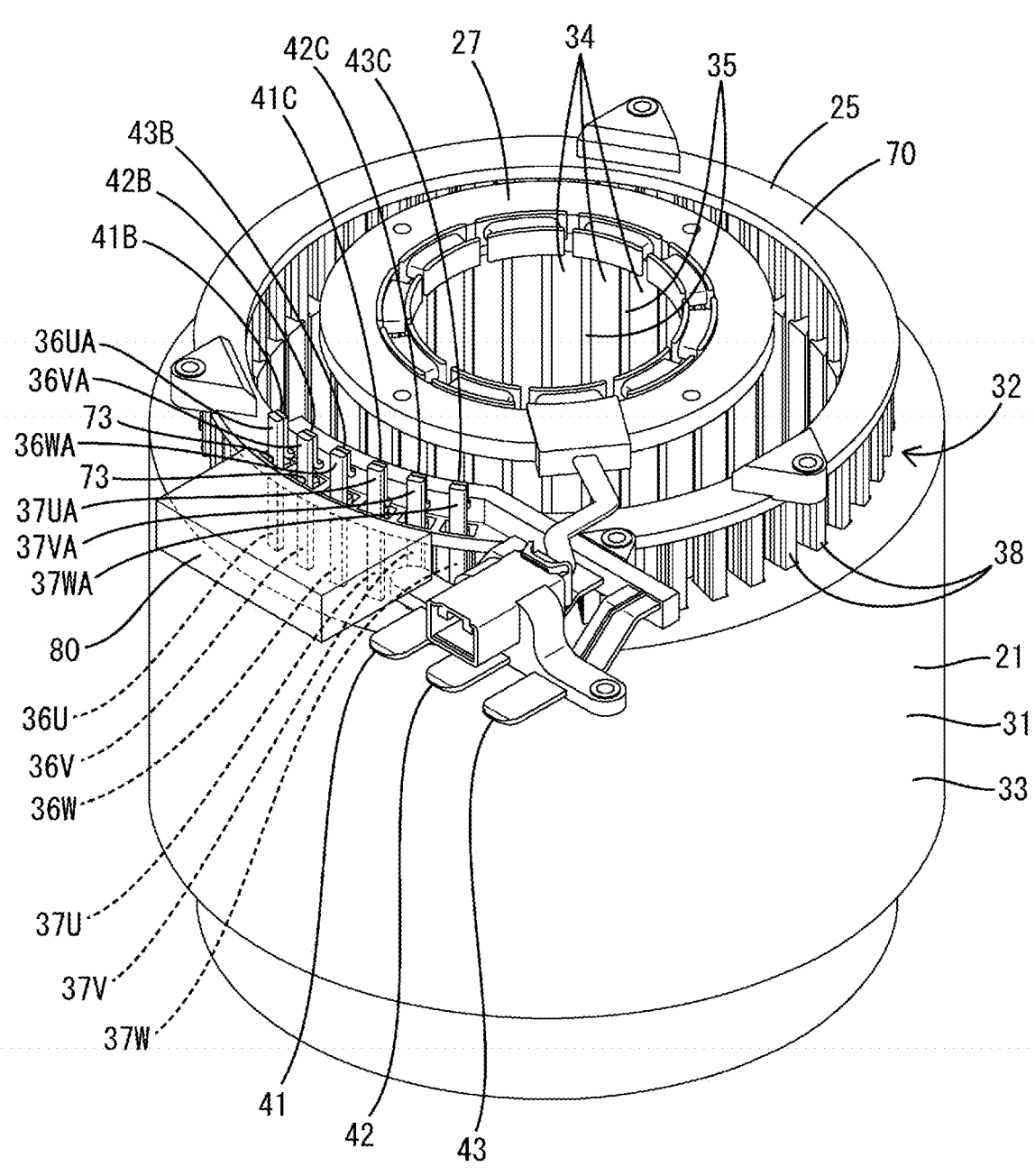
FIG. 2 is a perspective view illustrating a stator unit to which a rotation angle sensor and a coupling connector are attached.

The stator unit 21 is fixed to the inside of the housing 11. The rotor unit 23 is rotatably disposed inside the stator unit 21. As shown in FIG. 2, the coupling connector 25 is attached to the stator unit 21 from one side in the axial direction. Here, as indicated by the arrow in FIG. 1, the side of the motor 10 on which the opening of the housing 11 is formed is defined as "one side in the axial direction", and the side opposite to the "one side in the axial direction" is defined as "the other side in the axial direction". The coupling connector 25 supplies, as a driving current, a current supplied from the inverter to a multi-phase coil 32 of the stator unit 21, for example. The rotation angle sensor 27 is a so-called resolver, and detects the angle of rotation of the rotor unit 23. The rotation angle sensor 27 is supported by the flange 29 from the one side in the axial direction. The flange 29 covers the coupling connector 25, and supports the rotor unit 23 from the one side in the axial direction so that the rotor unit 23 can rotate.

As shown in FIG. 2, the stator unit 21 includes a stator core 31 and the multi-phase coil 32. The stator core 31 is formed by stacking hollow cylindrical magnetic steel sheets in the axial direction of the stator unit 21. The stator core 31 is provided with a yoke 33 and a plurality of teeth 34. The yoke 33 is annular extending in a circumferential direction of the stator unit 21. The teeth 34 protrude inward in a radial direction from an inner circumferential surface of the yoke 33. The plurality of teeth 34 are arranged at intervals from each other in the circumferential direction. Slots 35 are formed between adjacent teeth 34.

Figure 3:
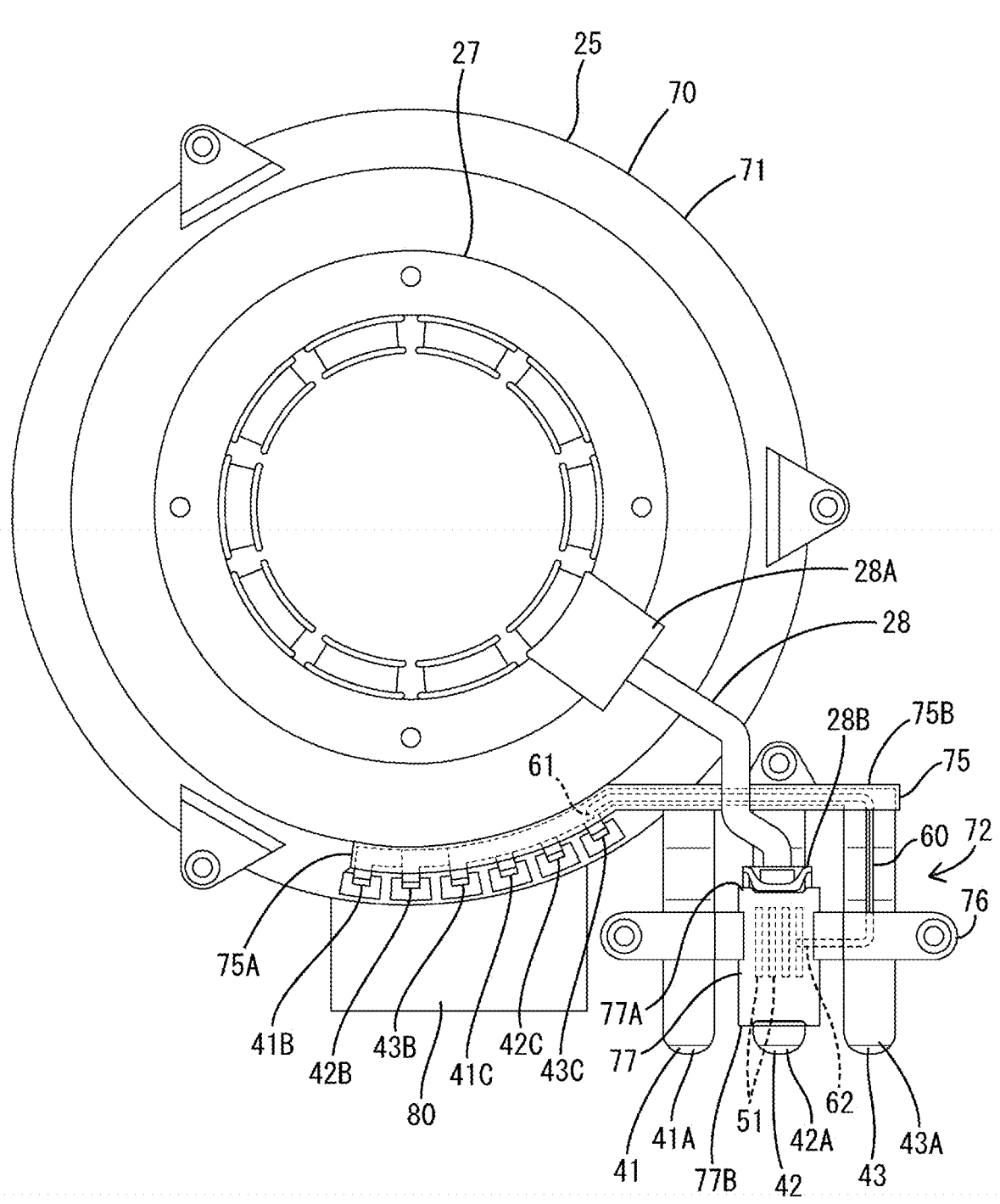
FIG. 3 is a plan view illustrating the coupling connector.

The multi-phase coil 32 is configured as a segmented coil with three phases. Note that FIGS. 2 and 3 show a configuration of the multi-phase coil 32 in a simplified manner. As shown in FIG. 2, the multi-phase coil 32 includes a first phase (U-phase) coil, a second phase (V-phase) coil, and a third phase (W-phase) coil. The first phase (U-phase) coil is constituted by coil parts 36U and 37U. The coil parts 36U and 37U correspond to "first coil parts" of the present disclosure. The second phase (V-phase) coil is constituted by coil parts 36V and 37V. The coil parts 36V and 37V correspond to "second coil parts" of the present disclosure. The third phase (W-phase) coil is constituted by coil parts 36W and 37W. The coil parts 36W and 37W correspond to "third coil parts" of the present disclosure. The following will describe the coil parts 36U, 36V, 36W, 37U, 37V, and 37W with reference to the simplified drawings, but the specific configurations of the coil parts 36U, 36V 36W, 37U, 37V, and 37W are not limited to the configurations below.

The coil parts 36U, 36V, 36W, 37U, 37V and 37W are respectively fitted to the plurality of teeth 34 while passing through the plurality of slots 35. As shown in FIG. 2, the coil parts 36U, 36V 36W, 37U, 37V, and 37W respectively have ends 36UA, 36VA, 36WA, 37UA, 37VA, and 37WA that protrude from the stator core 31 to one side in the axial direction. As shown in FIG. 2, the respective ends 36UA, 36VA, 36WA, 37UA, 37VA, and 37WA are externally in contact with and electrically connected to later-described conductive parts 41B, 42B, 43B, 41C, 42C, and 43C. As the electric configuration shown in FIG. 4, the other end 36UB of the coil part 36U and the other end 37UB of the coil part 37U are electrically connected to each other via a neutral busbar 38, the other end 36VB of the coil part 36V and the other end 37VB of the coil part 37V are also electrically connected to each other via a neutral busbar 38, and the other end 36WB of the coil part 36W and the other end 37WB of the coil part 37W are electrically connected to each other via a neutral busbar 38. The neutral busbars 38 each have a neutral point.

Figure 4:
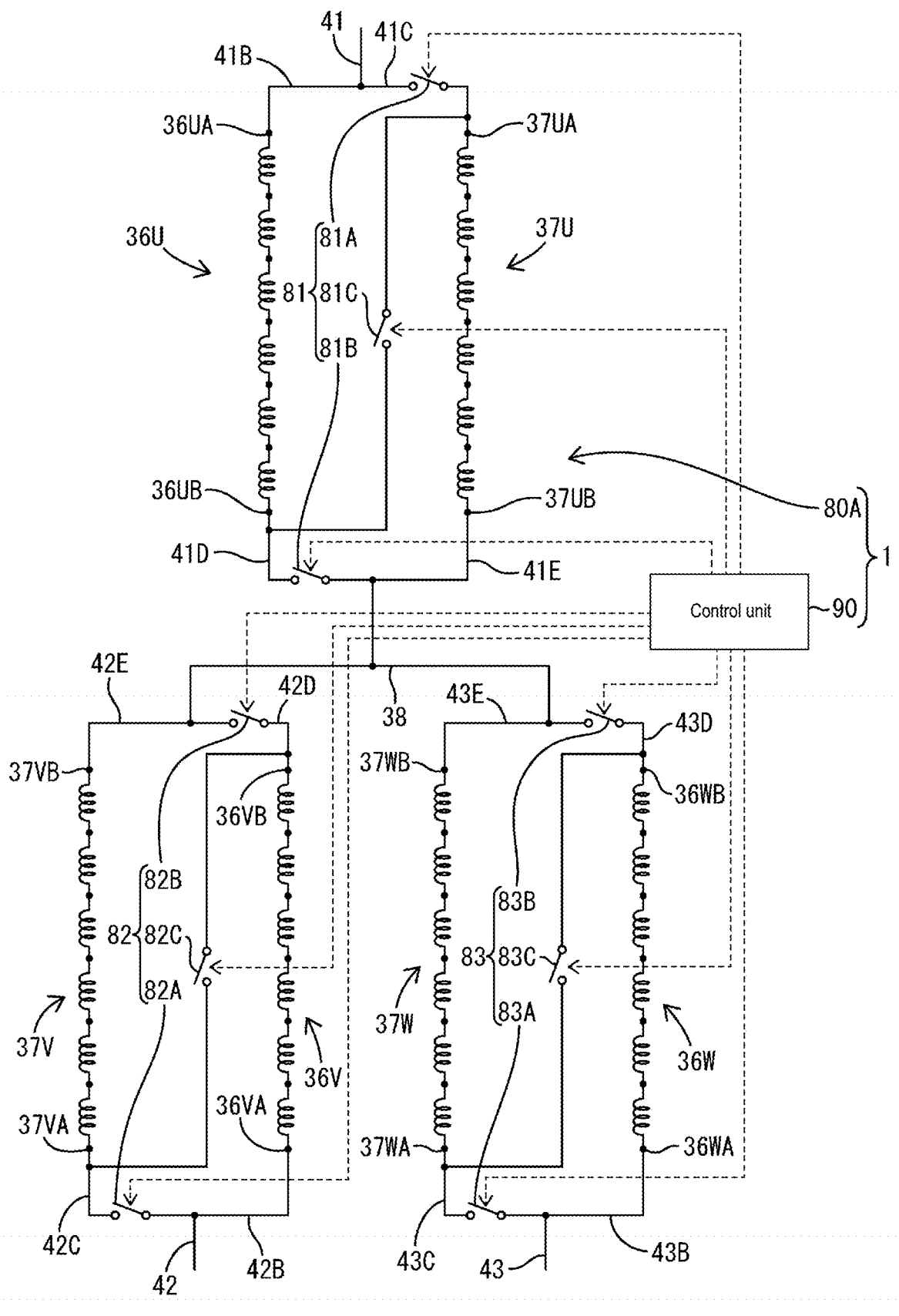
FIG. 4 illustrates examples of connection configurations between multi-phase coils, and a first switching unit, a second switching unit, and a third switching unit.

As shown in FIG. 4, the coil parts 36U, 37U, 36V 37V, 36W, and 37W each include a plurality of coil elements (wound parts). Specifically the coil parts 36U, 37U, 36V 37V 36W, and 37W have a configuration in which six coil elements (wound parts) are connected in series to each other.

As shown in FIGS. 1 and 2, the multi-phase coil 32 includes a plurality of coil ends 39 that protrude from the stator core 31 to the one side in the axial direction. As shown in FIG. 2, the coil ends 39 are constituted by portions of the coil parts 36U, 36V, 36W, 37U, 37V, and 37W that protrude from the stator core 31 to the one side in the axial direction.

Configuration of Sensor Connector

As shown in FIG. 3, the sensor connector 28 is provided between the rotation angle sensor 27 and the coupling connector 25. The sensor connector 28 is a connector that outputs a signal detected by the rotation angle sensor 27 to the outside. The sensor connector 28 is provided with a signal line (not shown), a sensor-side connection part 28A, and an output-side connection part 28B. The sensor-side connection part 28A is a socket connected to the rotation angle sensor 27. The output-side connection part 28B is attached to an input-side socket part 77A of a later-described holding unit 70. As a result of the output-side connection part 28B being attached to the input-side socket part 77A, the signal line of the sensor connector 28 is connected to a signal terminal 51 of the later-described coupling connector 25.

Configuration of Coupling Connector

As shown in FIG. 2, the coupling connector 25 is fixed to the stator unit 21. The coupling connector 25 is connected to the inverter, and supplies a driving current supplied from the inverter to the multi-phase coil 32. As shown in FIG. 3, the coupling connector 25 includes three busbars 41, 42, and 43, the signal terminal 51, a thermistor 60, and the holding unit 70. Note that the busbars 41, 42, and 43 and the coil parts 36U, 36V, 36W, 37U, 37V and 37W that are shown in FIG. 2, and the busbars 41, 42, and 43 shown in FIG. 3 are shown in a simplified manner without the later-described switching units 81, 82, and 83.

The busbar 41 is a conductive path interposed between the inverter and the multi-phase coil 32. As shown in FIG. 3, the busbar 41 includes a power terminal 41A, and conductive parts 41B and 41C. The power terminal 41A is electrically connected to an output terminal of the inverter. The conductive parts 41B and 41C extend and are branched from the power terminal 41A. The power terminal 41A is electrically connected to the coil parts 36U and 37U via the conductive parts 41B and 41C. The conductive parts 41B and 41C connect the coil parts 36U and 37U to the power terminal 41A in parallel.

The busbar 42 has the same configuration as the busbar 41, and includes, as shown in FIG. 3, a power terminal 42A, and conductive parts 42B and 42C. The power terminal 42A is electrically connected to the output terminal of the inverter. The conductive parts 42B and 42C are parts that connect the coil parts 36V and 37V to the busbar 42 in parallel. The power terminal 42A is electrically connected to the coil parts 36V and 37V via the conductive parts 42B and 42C.

The busbar 43 has the same configuration as the busbar 41, and includes, as shown in FIG. 3, a power terminal 43A, and conductive parts 43B and 43C. The power terminal 43A is electrically connected to the output terminal of the inverter. The conductive parts 43B and 43C are parts that connect the coil parts 36W and 37W to the busbar 43 in parallel. The power terminal 43A is electrically connected to the coil parts 36W and 37W via the conductive parts 43B and 43C.

The signal terminal 51 is a terminal that transmits a signal from the rotation angle sensor 27. The signal terminal 51 is disclosed in FIG. 3 by way of example, but the present disclosure is not limited to the shown configuration. The signal terminal 51 is held by the later-described holding unit 70 (a terminal holding unit 72). One end of the signal terminal 51 is connected to a signal line (not shown) of the sensor connector 28. The other end of the signal terminal 51 is connected to a terminal of an external socket, for example.

The thermistor 60 detects the temperature of the multi-phase coil 32. As shown in FIG. 3, one end 61 of a lead of the thermistor 60 is in contact with the conductive part 43C of the third phase (W-phase). The other end 62 of the lead of the thermistor 60 is disposed inside the socket 77 of the sensor connector 28.

As shown in FIG. 3, the holding unit 70 holds the three busbars 41, 42, and 43, the signal terminal 51, and the thermistor 60 as one piece. More specifically, the holding unit 70 holds the power terminals 41A, 42A, and 43A, the signal terminal 51, and the thermistor 60 as one piece. With this, the configurations of the coupling connector 25 holding the power terminals 41A, 42A, and 43A, the signal terminal 51, and the thermistor 60 can be simplified. The holding unit 70 further holds the first switching unit 81, the second switching unit 82, and the third switching unit 83, as will be described later. The holding unit 70 contains an insulating material. For example, the holding unit 70 may be made only of an insulating material. The holding unit 70 is made by molding using a resin material, for example.

As shown in FIG. 3, the holding unit 70 includes an annular part 71, a terminal holding unit 72, and an attachment 80. The annular part 71 corresponds to an example of a cover part of the present disclosure. The annular part 71 is fixed to an end of the stator unit 21 (the plurality of coil ends 39) in an annular shape. The annular part 71 covers and holds the plurality of coil ends 39 of the multi-phase coil 32 together, while defining their positional relationship.

The annular part 71 is provided with six holes 73 as shown in FIG. 2. The six holes 73 are lined up next to each other along the circumferential direction. The holes 73 pass through the annular part 71 in the axial direction. As shown in FIG. 2, the ends of the conductive parts 41B, 41C, 42B, 42C, 43B, and 43C of the multi-phase coil 32 are respectively inserted into the six holes 73. A plurality of recesses (not shown) recessed to the one side in the axial direction are formed in the annular part 71 on the other side in the axial direction. The recesses cover the coil ends 39. When the coil ends 39 are fitted into the recesses, the recesses are fixed to the coil ends 39.

As shown in FIG. 3, the terminal holding unit 72 is attached to the annular part 71. The terminal holding unit 72 belongs to the annular part 71. The terminal holding unit 72 includes, as shown in FIG. 3, a protruding portion 75 and a fixation portion 76. The protruding portion 75 is formed as one piece with the annular part 71. The protruding portion 75 includes a base 75A and a protrusion 75B. The base 75A stands upright from the annular part 71 on the one side in the axial direction. The base 75A is provided at a position of the annular part 71 inward of the six holes 73, as shown in FIG. 3. The protrusion 75B protrudes from one end in the circumferential direction of the base 75A outward (opposite to the axis of the annular part 71). The fixation portion 76 covers portions (central portions in the longitudinal direction) of the power terminals 41A, 42A, and 43A to fix the power terminals 41A, 42A, and 43A. The socket 77 is provided on the fixation portion 76. The socket 77 includes the input-side socket part 77A, and an output-side socket part 77B. The output-side connection part 28B of the sensor connector 28 is connected to the input-side socket part 77A. An external socket is connected to the output-side socket part 77B. The signal terminal 51 is formed as one piece with the socket 77, and is held by the socket 77.

As shown in FIG. 3, the terminal holding unit 72 covers the three busbars 41, 42, and 43. The base 75A holds the conductive parts 41B, 41C, 42B, 42C, 43B, and 43C together, as shown in FIG. 3. Ends of the conductive parts 41B, 41C, 42B, 42C, 43B, and 43C on one side (that are connected to the coil parts 36U, 37U, 36V 37V, 36W, and 37W) are exposed from the outer circumferential surface of the base 75A, and are bent to the one side in the axial direction. The power terminals 41A, 42A, and 43A are exposed from the protrusion 75B. The power terminals 41A, 42A, and 43A protrude in a direction orthogonal to the direction in which the protrusion 75B extends. The direction in which the external socket is connected to the output-side socket part 77B matches the direction in which the power terminals 41A, 42A, and 43A protrude.

As shown in FIG. 3, the power terminals 41A, 42A, and 43A, the signal terminal 51, and the thermistor 60 are held by the terminal holding unit 72 while being formed in one piece therewith. Specifically, the power terminals 41A, 42A, and 43A are formed in one piece with the protruding portion 75 and the fixation portion 76. The signal terminal 51 is formed as one piece with the fixation portion 76 (socket 77). The lead of the thermistor 60 on one end 61 side is covered by the protruding portion 75. The lead of the thermistor 60 on the other end 62 side is covered by the fixation portion 76. The other end 62 of the lead of the thermistor 60 is disposed inside the socket 77.

As shown in FIG. 3, the attachment 80 is attached to the annular part 71. The attachment 80 holds at least parts of the later-described switching units 81, 82, and 83. Although a description of a specific configuration is omitted, the attachment 80 is formed in a case shape for example, and houses at least parts of the later-described switching units 81, 82, and 83. Note that the configuration of the attachment 80 shown in FIG. 3 is disclosed by way of example, but the present disclosure is not limited to the shown configuration. The attachment 80 is provided outward, in the radial direction, of the annular part 71, and is formed as one piece with the annular part 71. With this, the first switching unit 81, the second switching unit 82, and the third switching unit 83 are formed as one piece with the terminal holding unit 72. The attachment 80 is provided in the vicinity of the conductive parts 41B, 41C, 42B, 42C, 43B, and 43C. The attachment 80 contains an insulating material. For example, the attachment 80 may be made only of an insulating material.

Switching Structure of Various Phase Coils Between Series Connection and Parallel Connection The following will describe a switching structure of the coils of the various phases between a series connection and a parallel connection, with reference to FIG. 4.

The coupling connector 25 includes the switching device 1 shown in FIG. 4. The switching device 1 includes switching units 80A and a control unit 90. The switching units 80A include the first switching unit 81, the second switching unit 82, and the third switching unit 83. Although not shown, the first switching unit 81, the second switching unit 82, and the third switching unit 83 are held by the holding unit 70. For example, the first switching unit 81, the second switching unit 82, and the third switching unit 83 are formed as one piece with the attachment 80, the annular part 71, and the protruding portion 75 of the terminal holding unit 72. Such a holding structure of the switching units 81, 82, and 83 is merely an example, and another configuration is also possible as long as they are held by the holding unit 70. The first switching unit 81 switches the coil parts 36U and 37U constituting the first phase (U-phase) coil between a series connection and a parallel connection. The second switching unit 82 switches the coil parts 36V and 37V constituting the second phase (V-phase) coil between a series connection and a parallel connection. The third switching unit 83 switches the coil parts 36W and 37W constituting the third phase (W-phase) coil between a series connection and a parallel connection.

The first switching unit 81 includes a plurality of first relays 81A, 81B, and 81C. The first relays 81A, 81B, and 81C are configured as semiconductor relays. Each semiconductor relay is constituted by, for example, a MOSFET, a GaNFET, an IGBT, or a bipolar transistor. The first relays 81A, 81B, and 81C are switched on and off in response to control signals from the control unit 90, which is provided separately. The first relays 81A, 81B, and 81C are turned on to bring a conductive path on which the corresponding first relay is provided into a state in which a current flows, and is turned off to bring the conductive path into a state in which no current flows. The control unit 90 is configured as, for example, an information processing device having a computation function and an information processing function. The control unit 90 may be configured as a microcomputer, but may also be an information processing device other than the microcomputer.

The second switching unit 82 includes second relays 82A, 82B, and 82C. The second relays 82A, 82B, and 82C have the same configuration as those of the first relays 81A, 81B, and 81C. The second relays 82A, 82B, and 82C are switched on and off in response to control signals from the control unit 90. The third switching unit 83 includes third relays 83A, 83B, and 83C. The third relays 83A, 83B, and 83C have the same configuration as those of the first relays 81A, 81B, and 81C. The third relays 83A, 83B, and 83C are switched on and off in response to control signals from the control unit 90.

As shown in FIG. 4, the conductive part 41B is electrically connected to the one end 36UA of the coil part 36U. A conductive part 41D, which is configured as a conductive path, is electrically connected to the other end 36UB of the coil part 36U. The conductive part 41C is electrically connected to the one end 37UA of the coil part 37U. A conductive part 41E, which is configured as a conductive path, is electrically connected to the other end 37UB of the coil part 37U. The conductive parts 41D and 41E are electrically connected to the neutral busbar 38.

As shown in FIG. 4, the first relay 81A is provided in the conductive part 41C. The first relay 81B is provided in the conductive part 41D. The first relay 81C is provided between the other end 36UB of the coil part 36U and the one end 37UA of the coil part 37U. Specifically, one end of first relay 81C is electrically connected to the other end 36UB of the coil part 36U and one end of the first relay 81B. The other end of the first relay 81C is electrically connected to the one end 37UA of the coil part 37U and one end (on the coil part 37U side) of the first relay 81A.

To connect the coil parts 36U and 37U in series to each other, the control unit 90 gives an off signal to the first relay 81A and the first relay 81B to turn them off, and gives an on signal to the first relay 81C to turn it on. To connect the coil parts 36U and 37U in parallel to each other, the control unit 90 gives an on signal to the first relay 81A and the first relay 81B to turn them on, and gives an off signal to the first relay 81C to turn it off.

As shown in FIG. 4, the conductive part 42B is electrically connected to the one end 36VA of the coil part 36V. A conductive part 42D, which is configured as a conductive path, is electrically connected to the other end 36VB of the coil part 36V. The conductive part 42C is electrically connected to the one end 37VA of the coil part 37V. A conductive part 42E, which is configured as a conductive path, is electrically connected to the other end 37VB of the coil part 37V. The conductive parts 42D and 42E are electrically connected to the neutral busbar 38.

As shown in FIG. 4, the second relay 82A is provided in the conductive part 42C. The second relay 82B is provided in the conductive part 42D. The second relay 82C is provided between the other end 36VB of the coil part 36V and the one end 37VA of the coil part 37V. Specifically, one end of the second relay 82C is electrically connected to the other end 36VB of the coil part 36V and one end of the second relay 82B. The other end of the second relay 82C is electrically connected to the one end 37VA of the coil part 37V and one end (on the coil part 37V side) of the second relay 82A.

To connect the coil parts 36V and 37V in series to each other, the control unit 90 gives an off signal to the second relay 82A and the second relay 82B to turn them off, and gives an on signal to the second relay 82C to turn it on. To connect the coil parts 36V and 37V in parallel to each other, the control unit 90 gives an on signal to the second relay 82A and the second relay 82B to turn them on, and gives an off signal to the second relay 82C to turn it off.

As shown in FIG. 4, the conductive part 43B is electrically connected to the one end 36WA of the coil part 36W. A conductive part 43D, which is configured as a conductive path, is electrically connected to the other end 36WB of the coil part 36W. The conductive part 43C is electrically connected to the one end 37WA of the coil part 37W. A conductive part 43E, which is configured as a conductive path, is electrically connected to the other end 37WB of the coil part 37W. The conductive parts 43D and 43E are electrically connected to the neutral busbar 38.

As shown in FIG. 4, the third relay 83A is provided in the conductive part 43C. The third relay 83B is provided in the conductive part 42D. The third relay 83C is provided between the other end 36WB of the coil part 36W and the one end 37WA of the coil part 37W. Specifically one end of the third relay 83C is electrically connected to the other end 36WB of the coil part 36W and one end of the third relay 83B. The other end of the third relay 83C is electrically connected to the one end 37WA of the coil part 37W and one end (on the coil part 37W side) of the third relay 83A.

To connect the coil parts 36W and 37W in series to each other, the control unit 90 gives an off signal to the third relay 83A and the third relay 83B to turn them off, and gives an on signal to the third relay 83C to turn it on. To connect the coil parts 36W and 37W in parallel to each other, the control unit 90 gives an on signal to the third relay 83A and the third relay 83B to turn them on, and gives an off signal to the third relay 83C to turn it off.

With the above-described configurations, the coupling connector 25 can switch the plurality of coil parts constituting the phase coils of the multi-phase coil 32 between a series connection and a parallel connection.

Figure 5:
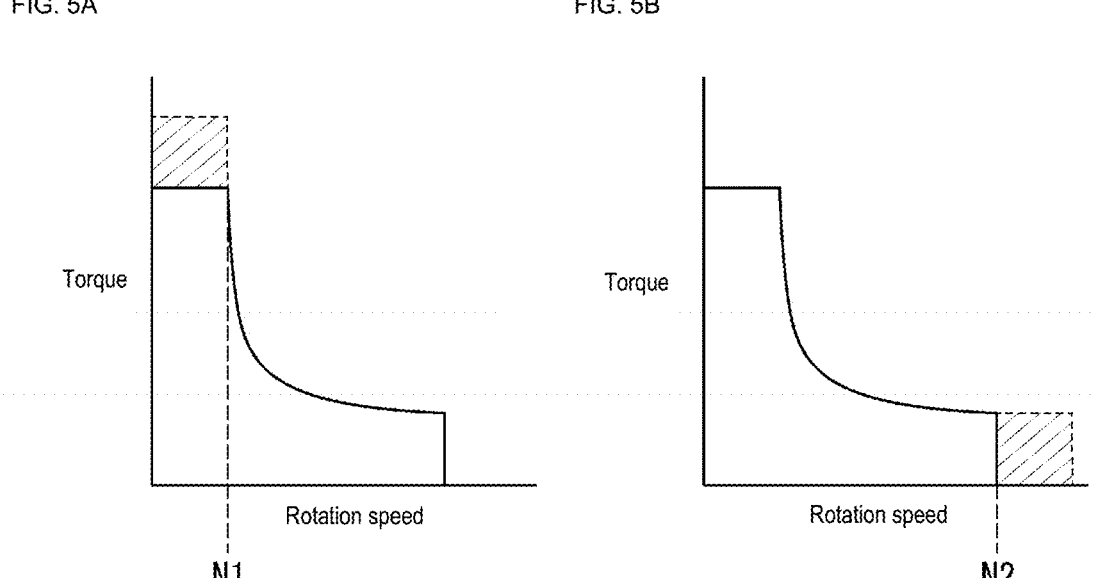
FIGS. 5A and 5B illustrate examples of a relationship between the rotation speed and the torque of the multi-phase motor.

FIG. 5 illustrates examples of a relationship between the rotation speed and the torque of the motor 10. As indicated by solid lines in FIG. 5, when the rotation speed of the motor 10 is relatively low, a relatively large torque is generated, and when the rotation speed of the motor 10 is relatively high, a relatively small torque is generated. For example, when the motor 10 is in a state of rotating at a given low speed, the switching units 81, 82, and 83 perform control such that the coil parts 36U and 37U are connected in series to each other, the coil parts 36V and 37V are connected in series to each other, and the coil parts 36W and 37W are connected in series to each other. The state of rotating at a given low speed refers to a state in which the rotation speed of the motor 10 is less than or equal to a predetermined threshold (a rotation speed N1 in FIG. 5(A)). By connecting the plurality of coil parts of each phase in series to each other when the motor 10 is in a state of rotating at a given low speed, it is possible to generate a larger torque as indicated by a dotted line in FIG. 5(A).

On the other hand, for example, when the motor 10 is in a state of rotating at a given high speed, the switching units 81, 82, and 83 perform control such that the coil parts 36U and 37U are connected in parallel to each other, the coil parts 36V and 37V are connected in parallel to each other, and the coil parts 36W and 37W are connected in parallel to each other. The state of rotating at a given high speed refers to a state in which the rotation speed of the motor 10 is greater than or equal to a predetermined threshold (a rotation speed N2 in FIG. 5(B)). By connecting the plurality of coil parts of each phase in parallel to each other when the motor 10 is in a state of rotating at a given high speed, it is possible to increase the rotation speed as indicated by a dotted line in FIG. 5(B).

Example of Effects

The following will describe effects of the first embodiment.

According to the coupling connector 25 (multi-phase motor switching device) of the present disclosure, the first switching unit 81 can switch the plurality of first coil parts 36U and 37U constituting the first-phase coil between a series connection and a parallel connection, the second switching unit 82 can switch the plurality of second coil parts 36V and 37V constituting the second-phase coil between a series connection and a parallel connection, and the third switching unit 83 can switch a plurality of third coil parts 36W and 37W constituting the third-phase coil between a series connection and a parallel connection. Accordingly, the coupling connector 25 (multi-phase motor switching device) can switch the plurality of coil parts constituting the phase coils between a series connection and a parallel connection.

The coupling connector 25 (multi-phase motor switching device) of the present disclosure has a configuration in which the first switching unit 81, the second switching unit 82, and the third switching unit 83 are held by the holding unit 70, and thus a simplified configuration can be realized compared to a configuration in which switching units 81, 82, and 83 are respectively held by different members. Furthermore, a configuration is realized in which the holding unit 70 is fixed to the stator unit 21 of the motor 10, making it possible to eliminate a configuration of holding the switching units 81, 82, and 83 between the holding unit 70 and the stator unit 21.

In the coupling connector 25 (multi-phase motor switching device) of the present disclosure, the first relays 81A, 81B, and 81C, the second relays 82A, 82B, and 82C, and the third relays 83A, 83B, and 83C are configured as semiconductor relays. With this, the first switching unit 81, the second switching unit 82, and the third switching unit 83 can have a compact configuration compared to a case where the relays are configured as mechanical relays.

The coupling connector 25 (multi-phase motor switching device) of the present disclosure includes the terminal holding unit 72 that holds the power terminals 41A, 42A, and 43A and contains an insulating material. The first switching unit 81, the second switching unit 82, and the third switching unit 83 are formed as one piece with the terminal holding unit 72. With this, the coupling connector 25 (multiphase motor switching device) may function as a structure of holding the power terminals 41A, 42A, and 43A.

The coupling connector 25 (multi-phase motor switching device) of the present disclosure includes the annular part (cover part) 71 containing an insulating material, the annular part (cover part) 71 being configured to cover and hold the plurality of coil ends 39 together, and defining their positional relationship. The annular part (cover part) 71, the first switching unit 81, the second switching unit 82, the third switching unit 83, and the terminal holding unit 72 are formed as one piece. With this, the annular part (cover part) 71 can be attached to a bundle of the coil ends 39, making it possible to ensure the insulation properties of the plurality of coil ends 39.

Second Embodiment

Overview of Multi-Phase Motor Switching Device

Similarly to the multi-phase motor switching device according to the first embodiment, a multi-phase motor switching device according to a second embodiment is a switching device for use in the motor 10. The motor 10 is a motor that is mounted on a vehicle for example, and generates a driving force for driving and rotating wheels. In the second embodiment, structural features other than the multi-phase motor switching device are the same as those in the first embodiment, and thus detailed descriptions thereof are omitted.

Figure 6:
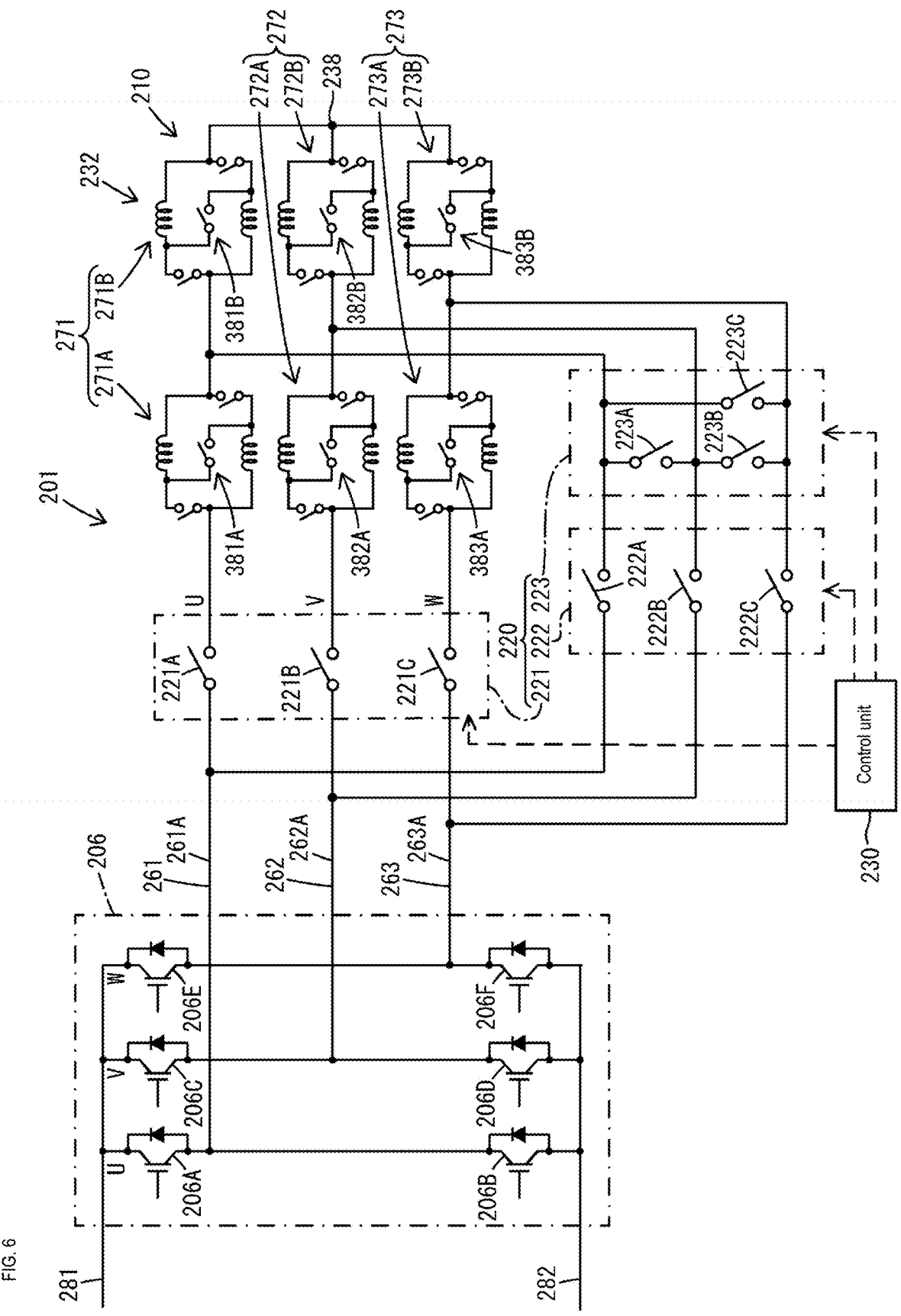
FIG. 6 is a circuit diagram schematically illustrating examples of phase coils, switching devices, and an inverter according to a second embodiment.

As shown in FIG. 6, a multi-phase motor switching device (hereinafter, referred to simply as switching device) 201 according to the second embodiment includes a series/ parallel switching unit 210, a connection switching unit 220, and a control unit 230. A multi-phase motor controlled and switched by the switching device 201 includes a stator unit (see FIG. 2). The stator unit includes a multi-phase coil 232 with a plurality of phases.

The multi-phase coil 232 is configured as a segmented coil with three phases. The multi-phase coil 232 includes a first phase (U-phase) coil 271, a second phase (V-phase) coil 272, and a third phase (W-phase) coil 273. The first phase (U-phase) coil 271 includes a first coil wire part 271A and a second coil wire part 271B. The first coil wire part 271A and the second coil wire part 271B are connected in series to each other. The second phase (V-phase) coil 272 includes a first coil wire part 272A and a second coil wire part 272B. The first coil wire part 272A and the second coil wire part 272B are connected in series to each other. The third phase (W-phase) coil 273 includes a first coil wire part 273A and a second coil wire part 273B. The first coil wire part 273A and the second coil wire part 273B are connected in series to each other.

Figure 7:
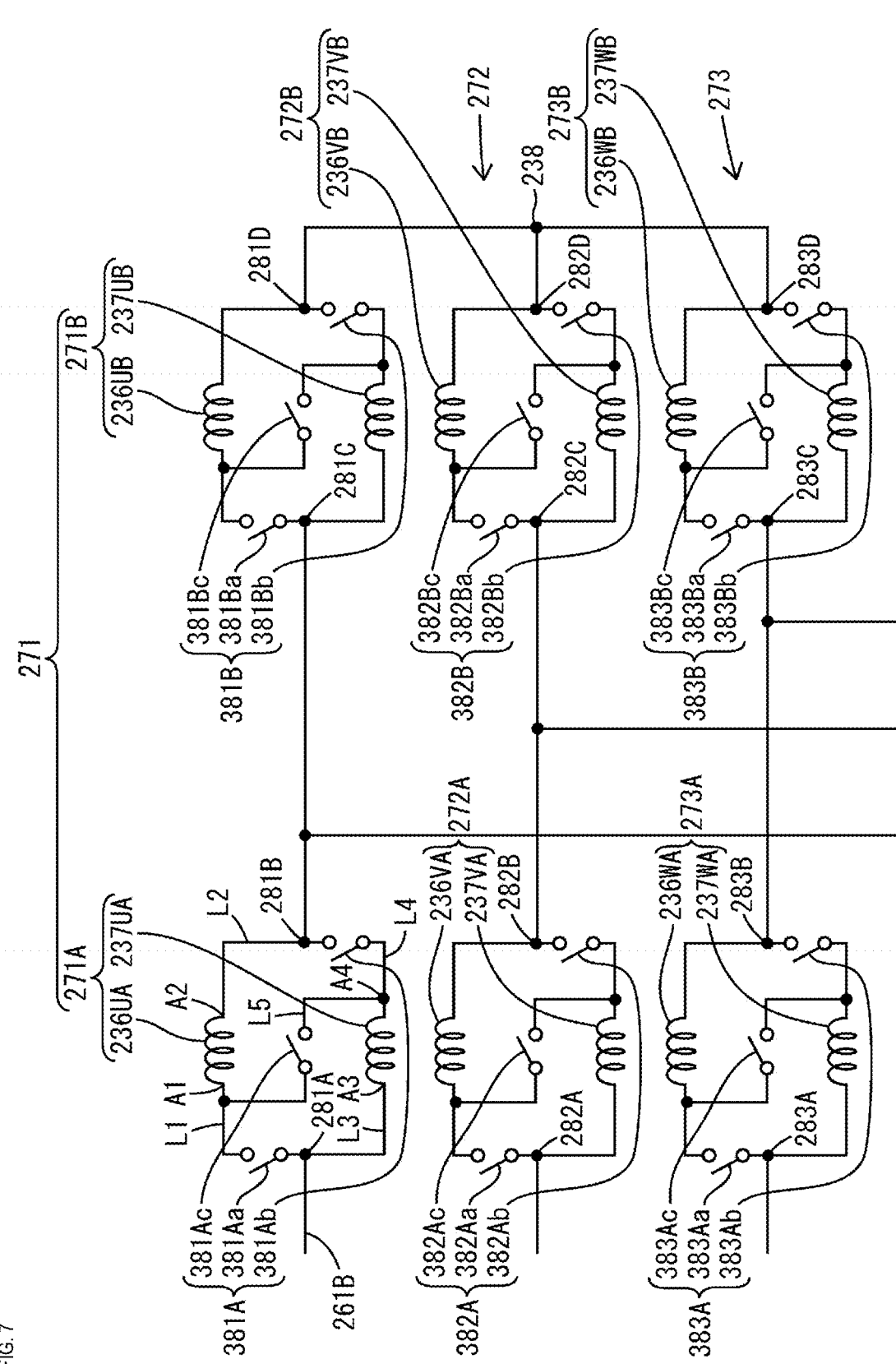
FIG. 7 is a circuit diagram illustrating phase coils and series/parallel switching units of the switching device shown in FIG. 6.

An end 281A shown in FIG. 7 corresponds to an example of a first end. The end 281A is one end of the first coil wire part 271A. The end 281A is electrically connected to a conductive path 261B of a U-phase conductive path 261, and is shorted (i.e. directly connected) to the conductive path 261B. An end 282A corresponds to an example of a second end. The end 282A is one end of the first coil wire part 272A. The end 282A is electrically connected to a conductive path 262B of a V-phase conductive path 262, and is shorted to the conductive path 262B. An end 283A is an example of a third end. The end 283A is one end of the first coil wire part 273A. The end 283A is electrically connected to a conductive path 263B of a W-phase conductive path 263, and is shorted to the conductive path 263B.

An end 281B is the other end of the first coil wire part 271A. The end 281B is electrically connected to an end 281C, and is shorted to the end 281C, which is one end of the second coil wire part 271B. An end 282B is the other end of the first coil wire part 272A. The end 282B is electrically connected to an end 282C, which is one end of the second coil wire part 272B, and is shorted to the end 282C. An end 283B is the other end of the first coil wire part 273A. The end 283C is electrically connected to an end 283C, which is one end of the second coil wire part 273B, and is shorted to the end 283C. An end 281D is the other end of the second coil wire part 271B. An end 282D is the other end of the second coil wire part 272B.

An end 283D is the other end of the second coil wire part 273B. The end 281D, the end 282D, and the end 283D are electrically connected to a short-circuit part 238, and are shorted to each other via the short-circuit part 238.

A pair of power paths 281 and 282 shown in FIG. 6 are conductive paths through which DC power based on power from a not-shown battery (for example, high voltage battery) is transmitted. The power path 281 is a power path on the higher potential side. The power path 282 is a power path on the lower potential side. For example, a DC voltage of a predetermined voltage can be applied between the pair of power paths 281 and 282.

Inverter and Conductive Path

An inverter 206 is an inverter circuit that outputs AC power of three phases, namely, a U-phase, a V-phase, and a W-phase. The three-phase AC power output from the inverter 206 is supplied to the multi-layer coils 271, 272, and 273 via the three conductive paths (the U-phase conductive path 261, the V-phase conductive path 262, and the W-phase conductive path 263). The inverter 206 includes switching elements 206A, 206C, and 206E, which function as upper arm elements, and switching elements 206B, 206D, and 206F, which function as lower arm elements. Each of the switching elements 206A, 206B, 206C, 206D, 206E, and 206F is constituted by, for example, an insulated gate bipolar transistor (IGBT) and a free-wheeling diode.

In the inverter 206, for example, the switching elements 206A, 206B, 206C, 206D, 206E, and 206F are repeatedly turned on and off upon receiving on/off signals (for example, PWM (pulse-width modulation) signals), and generate three-phase AC power. On/off control of the switching elements 206A, 206B, 206C, 206D, 206E, and 206F is performed by, for example, a not-shown electronic control unit (for example, an in-vehicle ECU (Electronic Control Unit, or the like)). An example of the method of controlling the inverter 206 using such an electronic control unit is a three-phase modulation method using PWM signals. Note that, for example, various methods such as a well-known V/f control or a well-known vector control may be employed as the method of controlling the inverter 206 using an electronic control unit.

In the inverter 206, a pair of U-phase switches are composed of the switching element 206A, which is an upper arm element, and the switching element 206B, which is a lower arm element. A pair of V-phase switches are composed of the switching element 206C, which is an upper arm element, and the switching element 206D, which is a lower arm element. A pair of W-phase switches are composed of the switching element 206E, which is an upper arm element, and the switching element 206F, which is a lower arm element.

The U-phase conductive path 261 is a conductive path between the switching elements 206A, 206B, and the U-phase coil 271. The U-phase conductive path 261 includes a conductive path 261A and the conductive path 261B. The conductive path 261A corresponds to an example of a first conductive path. The conductive path 261A is a conductive path between the switching elements 206A, 206B, and a switch 221A. One end of the conductive path 261A is electrically connected to a conductive path between the switching elements 206A and 206B. The other end of the conductive path 261A is electrically connected to one end of the switch 221A. The conductive path 261B is electrically connected to the other end of the switch 221A and one end of the U-phase coil 271. While the switch 221A is in an on state, the U-phase coil 271 may be shorted (i.e. connected directly) to the node between the switching elements 206A and 206B, and become conductive.

The V-phase conductive path 262 is a conductive path between the switching elements 206C, 206D, and the V-phase coil 272. The V-phase conductive path 262 includes a conductive path 262A and the conductive path 262B. The conductive path 262A corresponds to an example of a second conductive path. The conductive path 262A is a conductive path between the switching elements 206C, 206D, and a switch 221B. One end of the conductive path 262A is electrically connected to a conductive path between the switching elements 206C and 206D. The other end of the conductive path 262A is electrically connected to one end of the switch 221B. The conductive path 262B is electrically connected to the other end of the switch 221B and one end of the V-phase coil 272. While the switch 221B is in an on state, the V-phase coil 272 may be shorted (i.e. connected directly) to the node between the switching elements 206C and 206D, and become conductive.

The W-phase conductive path 263 is a conductive path between the switching elements 206E, 206F, and the W-phase coil 273. The W-phase conductive path 263 includes the conductive path 263A and the conductive path 263B. The conductive path 263A corresponds to an example of a third conductive path. The conductive path 263A is a conductive path between the switching elements 206E, 206F, and a switch 221C. One end of the conductive path 263A is electrically connected to a conductive path between the switching elements 206E and 206F. The other end of the conductive path 263A is electrically connected to one end of the switch 221C. The conductive path 263B is electrically connected to the other end of the switch 221C and one end of the W-phase coil 273. While the switch 221C is in an on state, the W-phase coil 273 may be shorted (i.e. connected directly) to the node between the switching elements 206E and 206F, and become conductive.

Configuration of Connection Switching Unit

The connection switching unit 220 is a device for switching the connection state of the plurality of coil wire parts of the coils 271, 272, and 273 of the various phases.

The control unit 230 is a device for controlling the connection switching unit 220. The control unit 230 may be, for example, an electronic control unit such as an in-vehicle ECU, or may be an information processing device having a micro-processing unit (MPU). The control unit 230 turns the switches constituting the connection switching unit 220 on/off Specifically, the control unit 230 can output an on signal and an off signal to the switches 221A, 221B, 221C, 222A, 222B, 222C, 223A, 223B, and 223C.

The connection switching unit 220 includes a first connection switching unit 221, a second connection switching unit 222, and a third connection switching unit 223. The first connection switching unit 221 is switched between a first shorted state and a first canceled state. The second connection switching unit 222 is switched between a second shorted state and a second canceled state. The third connection switching unit 223 is switched between a third shorted state and a third canceled state.

The first connection switching unit 221 includes the switches 221A, 221B, and 221C. Each of the switches 221A, 221B, and 221C may be constituted by, for example, at least one semiconductor switching element (such as field effect transistor (FET) or IGBT), or may be constituted by at least one mechanical relay.

The first shorted state refers to a state in which the switches 221A, 221B, and 221C are all turned on. While the switch 221A is in an on state, a current can flow in both directions through the switch 221A. While the switch 221B is in an on state, a current can flow in both directions through the switch 221B. While the switch 221C is in an on state, a current can flow in both directions through the switch 221C. That is to say, the first shorted state refers to a state in which the end 281A, which is one end of the first coil wire part 271A of the U-phase, and the conductive path 261A (first conductive path) are shorted, and the end 282A, which is one end of the first coil wire part 272A of the V-phase, and the conductive path 262A (second conductive path) are shorted, and the end 283A, which is one end of the first coil wire part 273A of the W-phase, and the conductive path 263A (third conductive path) are shorted.

The first canceled state refers to a state in which the switches 221A, 221B, and 221C are all turned off. While the switch 221A is in an off state, current flow in either direction is interrupted at the switch 221A. While the switch 221B is in an off state, current flow in either direction is interrupted at the switch 221B. While the switch 221C is in an off state, current flow in either direction is interrupted at the switch 221C. That is to say, the first canceled state refers to a state in which a short-circuit between the end 281A (first end) and the conductive path 261A (first conductive path) is canceled, a short-circuit between the end 282A (second end) and the conductive path 262A (second conductive path) is canceled, and a short-circuit between the end 283A (third end) and the conductive path 263A (third conductive path) is canceled. During the first canceled state, no current flows between the conductive path 261A and the conductive path 261B, no current flows between the conductive path 262A and the conductive path 262B, and no current flows between the conductive path 263A and the conductive path 263B. In the first canceled state, no current for driving the first coil wire parts 271A, 272A, and 273A is supplied.

The second connection switching unit 222 includes the switches 222A, 222B, and 222C. Each of the switches 222A, 222B, and 222C may be constituted by, for example, at least one semiconductor switching element (such as FET or IGBT), or may be constituted by at least one mechanical relay.

The second shorted state refers to a state in which the switches 222A, 222B, and 222C are all turned on. While the switch 222A is in an on state, a current can flow in both directions through the switch 222A. While the switch 222B is in an on state, a current can flow in both directions through the switch 222B. While the switch 222C is in an on state, a current can flow in both directions through the switch 222C. That is to say, the second shorted state refers to a state in which the end 281C (fourth end) and the conductive path 261A (first conductive path) are shorted, the end 282C (fifth end) and the conductive path 262A (second conductive path) are shorted, and the end 283C (sixth end) and the conductive path 263A (third conductive path) are shorted.

The second canceled state refers to a state in which the switches 222A, 222B, and 222C are all turned off. While the switch 222A is in an off state, current flow in either direction is interrupted at the switch 222A. While the switch 222B is in an off state, current flow in either direction is interrupted at the switch 222B. While the switch 222C is in an off state, current flow in either direction is interrupted at the switch 222C. That is to say, the second canceled state refers to a state in which a short-circuit between the end 281C (fourth end) and the conductive path 261A (first conductive path) is canceled, a short-circuit between the end 282C (fifth end) and the conductive path 262A (second conductive path) is canceled, and a short-circuit between the end 283C (sixth end) and the conductive path 263A (third conductive path) is canceled.

The third connection switching unit 223 includes the switches 223A, 223B, and 223C. Each of the switches 223A, 223B, and 223C may be constituted by, for example, at least one semiconductor switching element (such as FET or IGBT), or may be constituted by at least one mechanical relay.

The third shorted state refers to a state in which the switches 223A, 223B, and 223C are all turned on. While all of the switches 223A, 223B, and 223C are ON, the ends of the first coil wire parts 271A, 272A, and 273A are shorted to each other. While the switch 223A is in an on state, a current can flow in both directions through the switch 223A. While the switch 223B is in an on state, a current can flow in both directions through the switch 223B. While the switch 223C is in an on state, a current can flow in both directions through the switch 223C. The third shorted state refers to a state in which the end 281B, which is the other end of the first coil wire part 271A of the U-phase, the end 282B, which is the other end of the first coil wire part 272A of the V-phase, and the end 283B, which is the other end of the first coil wire part 273A of the W-phase are shorted to each other, and have the same potential. The plurality of ends constituted by the ends 281B, 282B, and 283B serve as another end group, and the third shorted state is a state in which the ends of the other end group are shorted to each other and have the same potential.

The third canceled state refers to a state in which the switches 223A, 223B, and 223C are all turned off. While the switch 223A is in an off state, current flow in either direction is interrupted at the switch 223A. While the switch 223B is in an off state, current flow in either direction is interrupted at the switch 223B. While the switch 223C is in an off state, current flow in either direction is interrupted at the switch 223C. The third canceled state refers to a state in which the short-circuits between the ends of the other end group are canceled, and specifically a state in which no current flows between the end 281B and the end 282B, between the end 282B and the end 283B, and the end 281B and the end 283B, through the switches 223A, 223B, and 223C.

As shown in FIG. 8, the first connection state is a state in which the first connection switching unit 221 is in a shorted state (first shorted state), the second connection switching unit 222 is in a canceled state (second canceled state), and the third connection switching unit 223 is in a canceled state (third canceled state). In the first connection state, the coil wires to be energized are the first coil wire parts 271A, 272A, and 273A, and the second coil wire parts 271B, 272B, and 273B. That is to say, the first connection state is a state in which current flow control is possible for all of the first coil wire parts 271A, 272A, and 273A of the multi-phase coils 271, 272, and 273, and the second coil wire parts 271B, 272B, and 273B. As shown in FIGS. 9 to 12, in the first connection state, the switches 221A, 221B, and 221C are turned on, the switches 222A, 222B, and 222C are turned off, the switches 223A, 223B, and 223C are turned off, and the short-circuit part 238 serves as a neutral point. Accordingly, the first coil wire part 271A and the second coil wire part 271B connected in series to each other function together as coil wires of the U phase, and a current flows through all of them. The first coil wire part 272A and the second coil wire part 272B connected in series to each other function together as coil wires of the V phase, and a current flows through all of them. The first coil wire part 273A and the second coil wire part 273B connected in series to each other function together as coil wires of the W phase, and a current flows through all of them.

Figure 13:
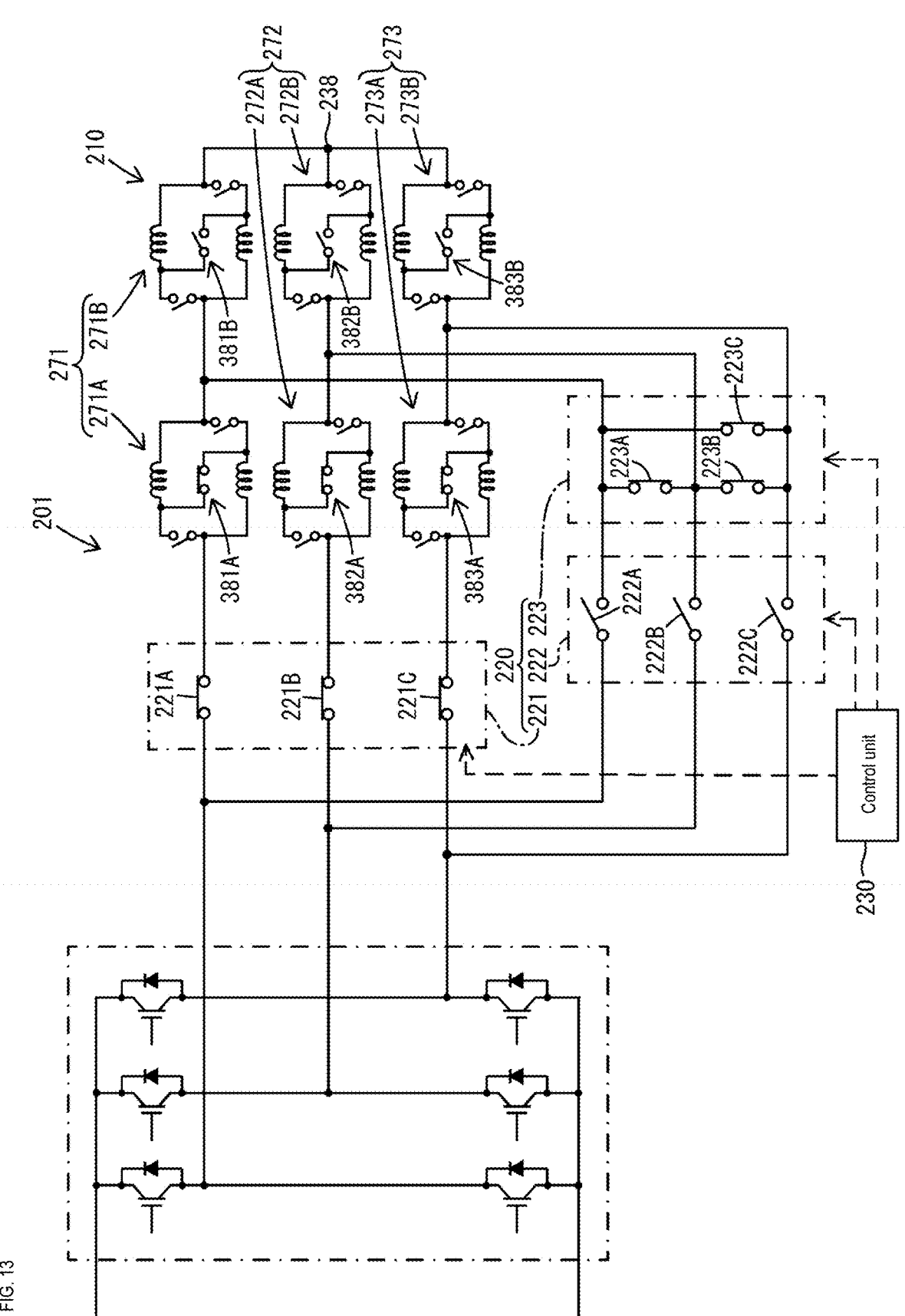
FIG. 13 illustrates a fifth state of the switching device of FIG. 6.
Figure 14:
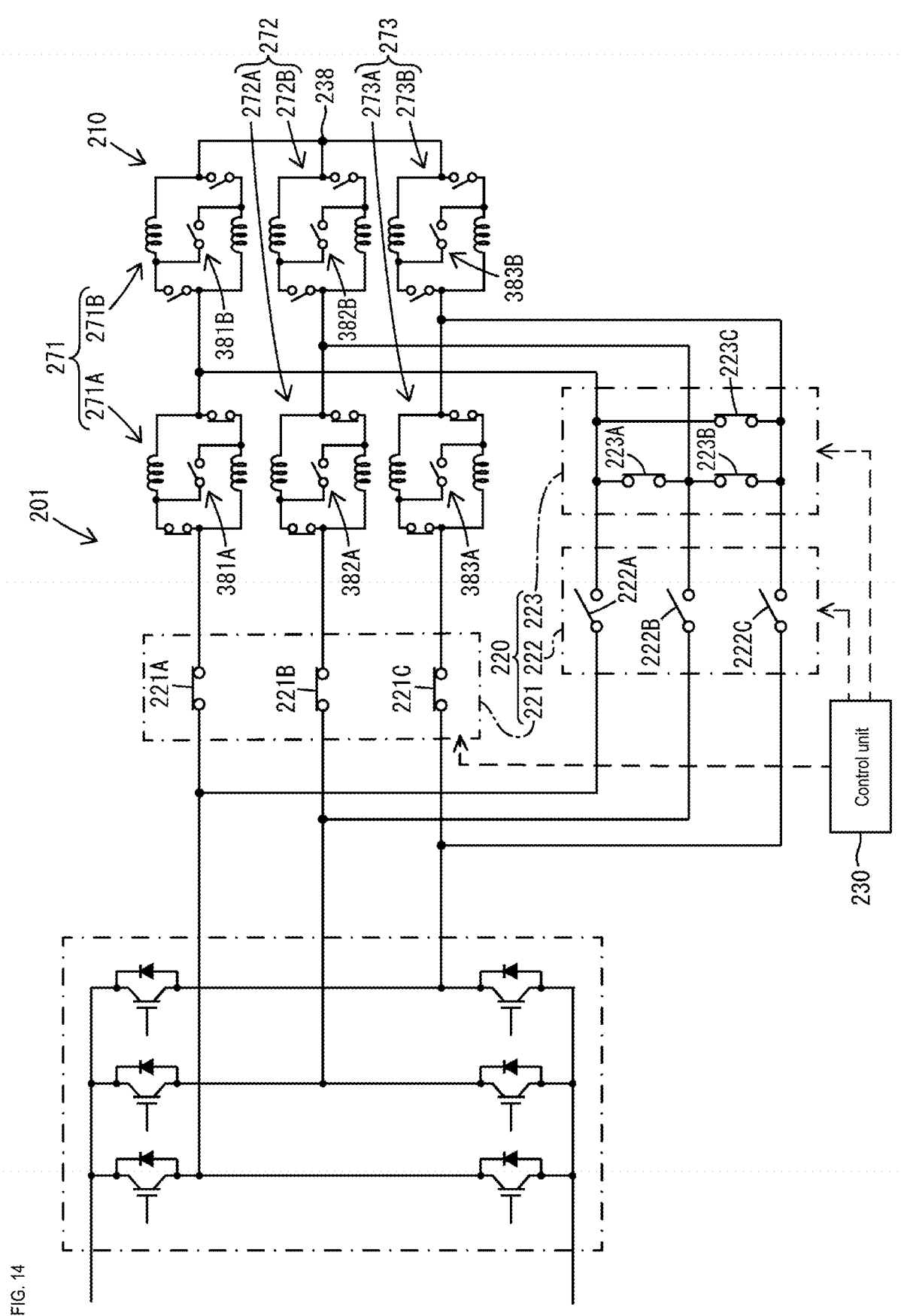
FIG. 14 illustrates a sixth state of the switching device of FIG. 6.

As shown in FIG. 8, the second connection state is a state in which the first connection switching unit 221 is in a shorted state (first shorted state), the second connection switching unit 222 is in a canceled state (second canceled state), and the third connection switching unit 223 is in a shorted state (third shorted state). In the second connection state, the coil wires to be energized are the first coil wire parts 271A, 272A, and 273A. That is to say, the second connection state is a state in which current flow control is possible for the first coil wire parts 271A, 272A, and 273A of the multi-phase coils 271, 272, and 273, and current flow control is interrupted for the second coil wire parts 271B, 272B, and 273B. As shown in FIGS. 13 and 14, in the second connection state, the switches 221A, 221B, and 221C are turned on, the switches 222A, 222B, and 222C are turned off, the switches 223A, 223B, and 223C are turned on, and the third connection switching unit 223 serves as a neutral point. Accordingly, a current flows through the first coil wire parts 271A, 272A, and 273A, and no current flows through the second coil wire parts 271B, 272B, and 273B.

Figure 15:
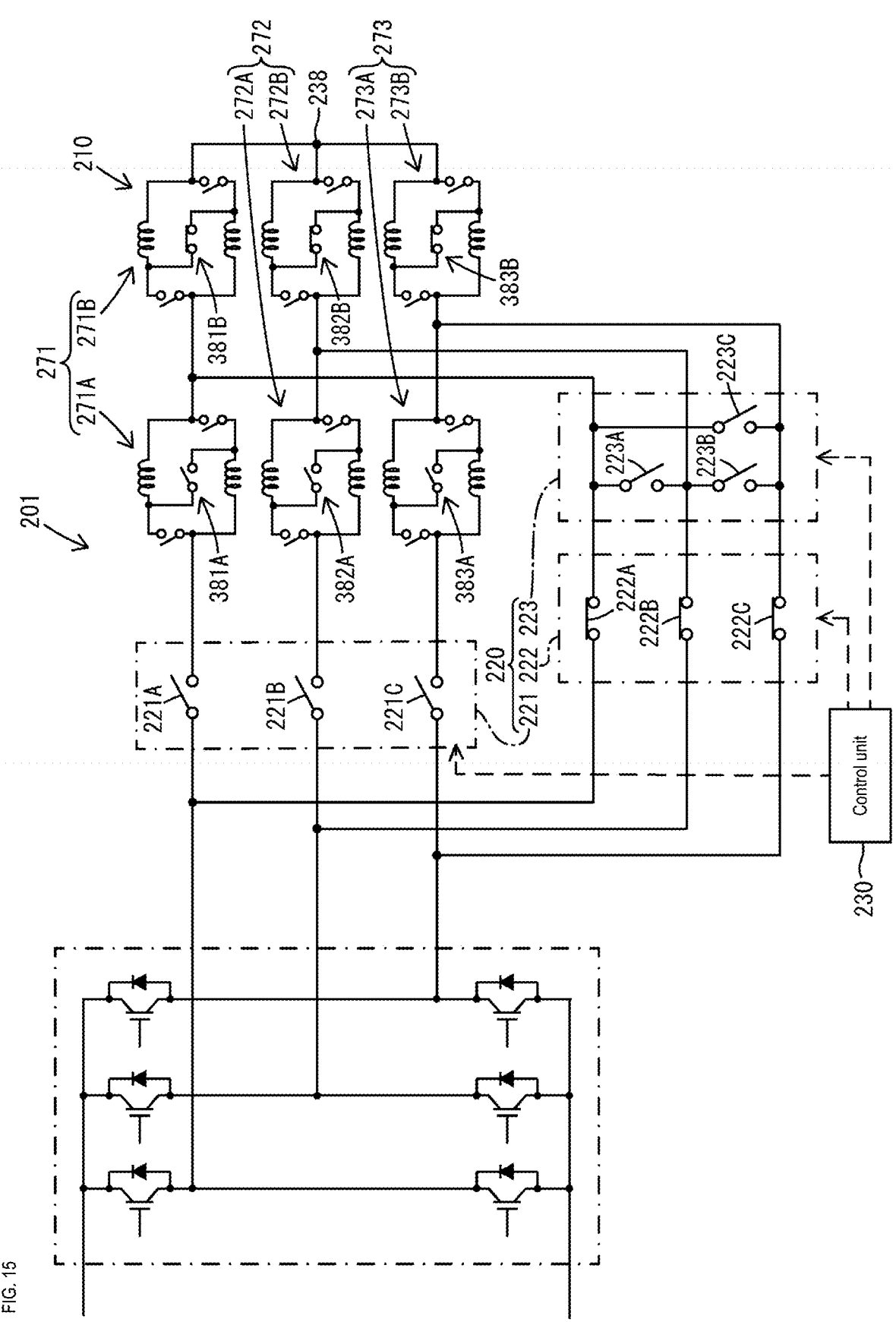
FIG. 15 illustrates a seventh state of the switching device of FIG. 6.
Figure 16:
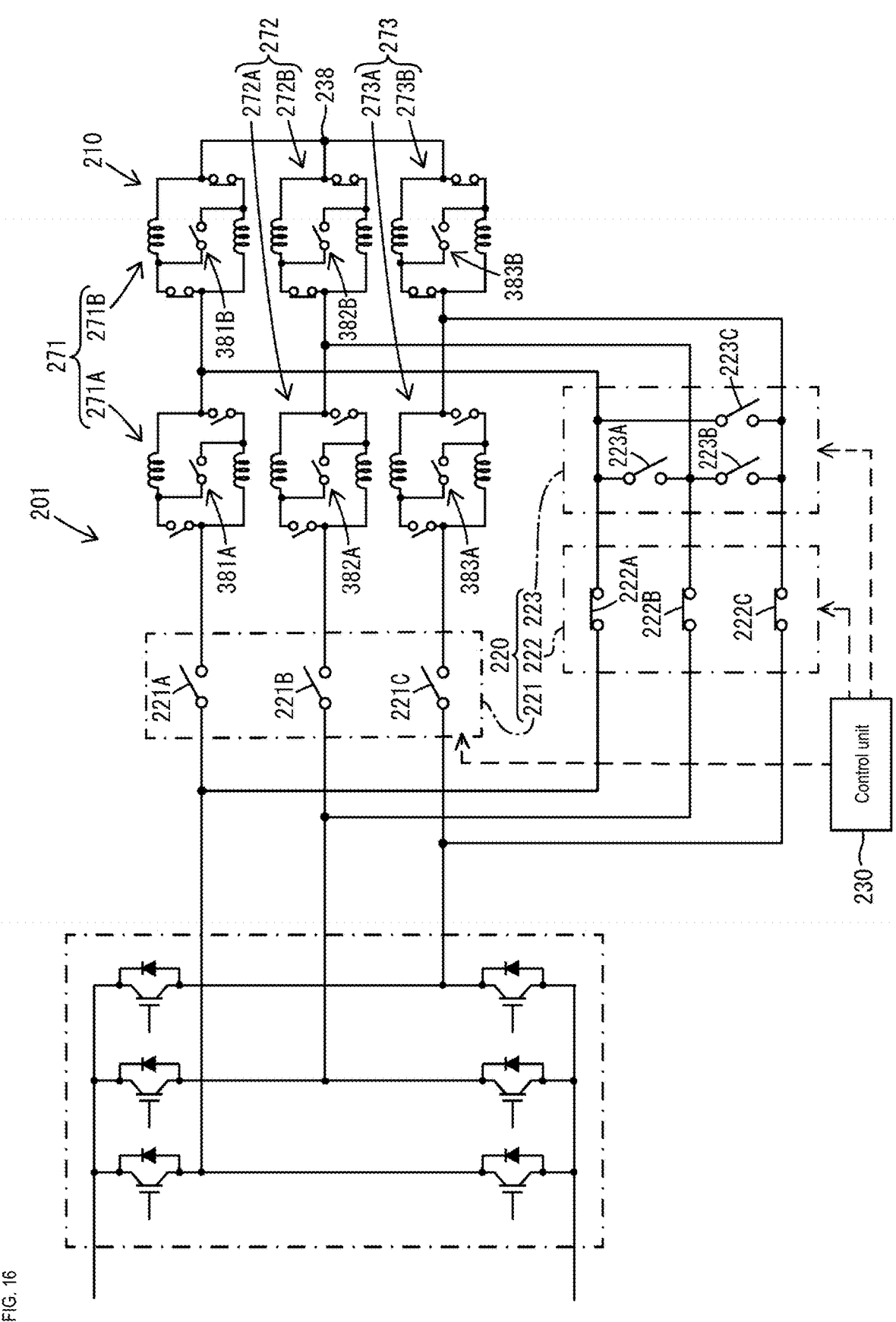
FIG. 16 illustrates an eighth state of the switching device of FIG. 6.

As shown in FIG. 8, the third connection state is a state in which the first connection switching unit 221 is in a canceled state (first canceled state), the second connection switching unit 222 is in a shorted state (second shorted state), and the third connection switching unit 223 is in a canceled state (third canceled state). In the third connection state, the coil wires to be energized are the second coil wire part 271B, 272B, and 273B. That is to say, the third connection state is a state in which current flow control is possible for the second coil wire parts 271B, 272B, and 273B of the multi-phase coils 271, 272, and 273, and current flow control is interrupted for the first coil wire parts 271A, 272A, and 273A. As shown in FIGS. 15 to 16, in the third connection state, the switches 222A, 222B, and 222C are turned on, the switches 221A, 221B, and 221C are turned off, the switches 223A, 223B, and 223C are turned off, and the short-circuit part 238 serves as a neutral point. Accordingly, a current flows through the second coil wire parts 271B, 272B, and 273B, and no current flows through the first coil wire part 271A, 272A, and 273A.

As shown in FIG. 8, the fourth connection state is a state in which the first connection switching unit 221 is in a canceled state (first canceled state), the second connection switching unit 222 is in a canceled state (second canceled state), and the third connection switching unit 223 is in a canceled state (third canceled state). In the fourth connection state, no current flows through any of the first coil wire parts 271A, 272A, and 273A and the second coil wire parts 271B, 272B, and 273B.

Configuration of Series/parallel Switching Unit

The series/parallel switching unit 210 is a device for switching a plurality of coil parts of each of the multi-phase coils 271, 272, and 273 between a series connection and a parallel connection. The series/parallel switching unit 210 corresponds to an example of a switching unit.

As shown in FIG. 7, the first coil wire part 271A includes a coil part 236UA and 237UA. The coil parts 236UA and 237UA correspond to "first coil parts" of the present disclosure. The second coil wire part 271B includes coil parts 236UB and 237UB. The coil parts 236UB and 237UB correspond to "first coil parts" of the present disclosure. The first coil wire part 272A includes coil parts 236VA and 237VA. The coil parts 236VA and 237VA correspond to "second coil parts" of the present disclosure. The second coil wire part 272B includes coil parts 236VB and 237VB. The coil parts 236VB and 237VB correspond to "second coil parts" of the present disclosure. The first coil wire part 273A includes coil parts 236WA and 237WA. The coil parts 236WA and 237WA correspond to "third coil parts" of the present disclosure. The second coil wire part 273B includes coil parts 236WB and 237WB. The coil parts 236WB and 237WB correspond to "third coil parts" of the present disclosure.

As shown in FIGS. 6 and 7, the series/parallel switching unit 210 includes first switching units 381A and 381B, second switching units 382A and 382B, and third switching unit 383A and 383B. The first switching unit 381A switches the coil parts 236UA and 237UA constituting the first coil wire part 271A between a series connection and a parallel connection. The first switching unit 381B switches the coil parts 236UB and 237UB constituting the second coil wire part 271B between a series connection and a parallel connection. The second switching unit 382A switches the coil parts 236VA and 237VA constituting the first coil wire part 272A between a series connection and a parallel connection. The second switching unit 382B switches the coil parts 236VB and 237VB constituting the second coil wire part 272B between a series connection and a parallel connection. The third switching unit 383A switches the coil parts 236WA and 237WA constituting the first coil wire part 273A between a series connection and a parallel connection. The third switching unit 383B switches the coil parts 236WB and 237WB constituting the second coil wire part 273B between a series connection and a parallel connection.

The first switching unit 381A includes a plurality of first relays 381Aa, 381Ab, and 381Ac. The first relays 381Aa, 381Ab, and 381Ac are configured as semiconductor relays. The semiconductor relays are constituted by, for example, MOSFET, GaNFET, IGBT, or bipolar transistors. The first relays 381Aa, 381Ab, and 381Ac are switched on and off in response to control signals from the control unit 230. The first relays 381Aa, 381Ab, and 381Ac are turned on to bring a conductive path on which the corresponding first relay is provided into a state in which a current flows, and are turned off to bring the conductive path into a state in which no current flows.

The first switching unit 381B includes a plurality of first relays 381Ba, 381Bb, and 381Bc. The first relays 381Ba, 381Bb, and 381Bc have the same configuration as the first relay 381Aa. The first relays 381Ba, 381Bb, and 381Bc are switched on and off in response to control signals from the control unit 230.

The second switching unit 382A includes a plurality of second relays 382Aa, 382Ab, and 382Ac. The second relays 382Aa, 382Ab, and 382Ac have the same configuration as the first relay 381Aa. The second relays 382Aa, 382Ab, and 382Ac are switched on and off in response to control signals from the control unit 230.

The second switching unit 382B includes a plurality of second relays 382Ba, 382Bb, and 382Bc. The second relays 382Ba, 382Bb, and 382Bc have the same configuration as the first relay 381Aa. The second relays 382Ba, 382Bb, and 382Bc are switched on and off in response to control signals from the control unit 230.

The third switching unit 383A includes a plurality of third relays 383Aa, 383Ab, and 383Ac. The third relays 383Aa, 383Ab, and 383Ac have the same configuration as the first relay 381Aa. The third relays 383Aa, 383Ab, and 383Ac are switched on and off in response to control signals from the control unit 230.

The third switching unit 383B includes a plurality of third relays 383Ba, 383Bb, and 383Bc. The third relays 383Ba, 383Bb, and 383Bc have the same configuration as the first relay 381Aa. The third relays 383Ba, 383Bb, and 383Bc are switched on and off in response to control signals from the control unit 230.

As shown in FIG. 7, the first coil wire part 271A includes the coil parts 236UA and 237UA, and conductive parts L1, L2, L3, L4, and L5. One end of the conductive part L1 is configured as the end 281A. The other end of the conductive part L1 is electrically connected to one end A1 of the coil part 236UA. One end of the conductive part L2 is configured as the end 281B. The other end of the conductive part L2 is electrically connected to the other end A2 of the coil part 236UA. One end of the conductive part L3 is configured as the end 281A. The other end of the conductive part L3 is electrically connected to one end A3 of the coil part 237UA. One end of the conductive part L4 is configured as the end 281B. The other end of the conductive part L4 is electrically connected to the other end A4 of the coil part 237UA. One end of the conductive part L5 is electrically connected to the one end A1 of the coil part 236UA. The other end of the conductive part L5 is electrically connected to the other end A4 of the coil part 237UA.

As shown in FIG. 7, the first relay 381Aa is provided on the conductive part L1. One end of the first relay 381Aa is electrically connected to the end 281A. The other end of the first relay 381Aa is electrically connected to the one end A1 of the coil part 236UA and one end of the first relay 381Ac. The first relay 381Ab is provided on the conductive part L4. One end of the first relay 381Ab is electrically connected to the end 281B. The other end of the first relay 381Ab is electrically connected to the other end A4 of the coil part 237UA and the other end of the first relay 381Ac. The first relay 381Ac is provided on the conductive part L5.

The control unit 230 gives an off signal to the first relay 381Aa and the first relay 381Ab to turn them off, and gives an on signal to the first relay 381Ac to turn it on, so that the coil parts 236UA and 237UA are connected in series to each other. The control unit 230 gives an on signal to the first relay 381Aa and the first relay 381Ab to turn them on, and gives an off signal to the first relay 381Ac to turn it off, so that the coil parts 236UA and 237UA are connected in parallel to each other.

The second coil wire part 271B has the same configuration as the first coil wire part 271A. The control unit 230 gives an off signal to the first relay 381Ba and the first relay 381Bb to turn them off, and gives an on signal to the first relay 381Bc to turn it on, so that the coil parts 236UB and 237UB are connected in series to each other. The control unit 230 gives an on signal to the first relay 381Ba and the first relay 381Bb to turn them on, and gives an off signal to the first relay 381Bc to turn it off, so that the coil parts 236UB and 237UB are connected in parallel to each other.

The first coil wire part 272A has the same configuration as the first coil wire part 271A. The control unit 230 gives an off signal to the second relay 382Aa and the second relay 382Ab to turn them off, and gives an on signal to the second relay 382Ac to turn it on, so that the coil parts 236VA and 237VA are connected in series to each other. The control unit 230 gives an on signal to the second relay 382Aa and the second relay 382Ab to turn them on, and gives an off signal to the second relay 382Ac to turn it off, so that the coil parts 236VA and 237VA are connected in parallel to each other.

The second coil wire part 272B has the same configuration as the first coil wire part 271A. The control unit 230 gives an off signal to the second relay 382Ba and the second relay 382Bb to turn them off, and gives an on signal to the second relay 382Bc to turn it on, so that the coil parts 236VB and 237VB are connected in series to each other. The control unit 230 gives an on signal to the second relay 382Ba and the second relay 382Bb to turn them on, and gives an off signal to the second relay 382Bc to turn it off, so that the coil parts 236VB and 237VB are connected in parallel to each other.

The first coil wire part 273A has the same configuration as the first coil wire part 271A. The control unit 230 gives an off signal to the third relay 383Aa and the third relay 383Ab to turn them off, and gives an on signal to the third relay 383Ac to turn it on, so that the coil parts 236WA and 237WA are connected in series to each other. The control unit 230 gives an on signal to the third relay 383Aa and the third relay 383Ab to turn them on, and gives an off signal to the third relay 383Ac to turn it off, so that the coil parts 236WA and 237WA are connected in parallel to each other.

The second coil wire part 273B has the same configuration as the first coil wire part 271A. The control unit 230 gives an off signal to the third relay 383Ba and the third relay 383Bb to turn them off, and gives an on signal to the third relay 383Bc to turn it on, so that the coil parts 236WB and 237WB are connected in series to each other. The control unit 230 gives an on signal to the third relay 383Ba and the third relay 383Bb to turn them on, and gives an off signal to the third relay 383Bc to turn it off, so that the coil parts 236WB and 237WB are connected in parallel to each other.

With the above-described configurations, the series/parallel switching unit 210 can switch the coil parts of each of the coil wire parts between a series connection and a parallel connection.

Operation of Switching Device

In a representative example of the second embodiment described below, the number of windings of the coil parts 236UA and 237UA of the first coil wire part 271A of the U-phase (first phase) coil 271 is greater than the number of windings of the coil parts 236UB and 237UB of the second coil wire part 271B. The number of windings of the coil parts 236VA and 237VA of the first coil wire part 272A of the V-phase (second phase) coil 272 is greater than the number of windings of the coil parts 236VB and 237VB of the second coil wire part 272B. And the number of windings of the coil parts 236WA and 237WA of the first coil wire part 273A of the W-phase (third phase) coil 273 is greater than the number of windings of the coil parts 236WB and 237WB of the second coil wire part 273B. That is to say, in all of the phases, the number of windings of the coil parts of the first coil wire part is greater than the number of windings of the coil parts of the second coil wire part.

In the U-phase (first phase) coil 271, when, by the series/parallel switching unit 210, the coil parts 236UA and 237UA of the first coil wire part 271A are connected in series to each other, and the plurality of coil parts 236UB and 237UB constituting the second coil wire part 271B are connected in series to each other, the combined inductance of the first coil wire part 271A is greater than the combined inductance of the second coil wire part 271B. Similarly, in the V-phase (second phase) coil 272, when, by the series/parallel switching unit 210, the coil parts 236VA and 237VA of the first coil wire part 272A are connected in series to each other, and the plurality of coil parts 236VB and 237VB constituting the second coil wire part 272B are connected in series to each other, the combined inductance of the first coil wire part 272A is greater than the combined inductance of the second coil wire part 272B. Similarly, in the third phase (W-phase) coil 273, when, by the series/parallel switching unit 210, the coil parts 236WA and 237WA of the first coil wire part 273A are connected in series to each other, and the plurality of coil parts 236WB and 237WB constituting the second coil wire part 273B are connected in series to each other, the combined inductance of the first coil wire part 273A is greater than the combined inductance of the second coil wire part 273B.

In the U-phase (first phase) coil 271, when, by the series/parallel switching unit 210, the coil parts 236UA and 237UA of the first coil wire part 271A are connected in parallel to each other, and the plurality of coil parts 236UB and 237UB constituting the second coil wire part 271B are connected in parallel to each other, the combined inductance of the first coil wire part 271A is greater than the combined inductance of the second coil wire part 271B. Similarly, in the V-phase (second phase) coil 272, when, by the series/parallel switching unit 210, the coil parts 236VA and 237VA of the first coil wire part 272A are connected in parallel to each other, and the plurality of coil parts 236VB and 237VB constituting the second coil wire part 272B are connected in parallel to each other, the combined inductance of the first coil wire part 272A is greater than the combined inductance of the second coil wire part 272B. Similarly, in the W-phase (third phase) coil 273, when, by the series/parallel switching unit 210, the coil parts 236WA and 237WA of the first coil wire part 273A are connected in parallel to each other, and the plurality of coil parts 236WB and 237WB constituting the second coil wire part 273B are connected in parallel to each other, the combined inductance of the first coil wire part 273A is greater than the combined inductance of the second coil wire part 273B.

The switching device 201 is switched between a first state, a second state, a third state, a fourth state, a fifth state, a sixth state, a seventh state, and an eighth state. The switching device 201 is switched to any one of the first state, the second state, the third state, the fourth state, the fifth state, the sixth state, the seventh state, and the eighth state, in accordance with the control of the control unit 230.

Figure 9:
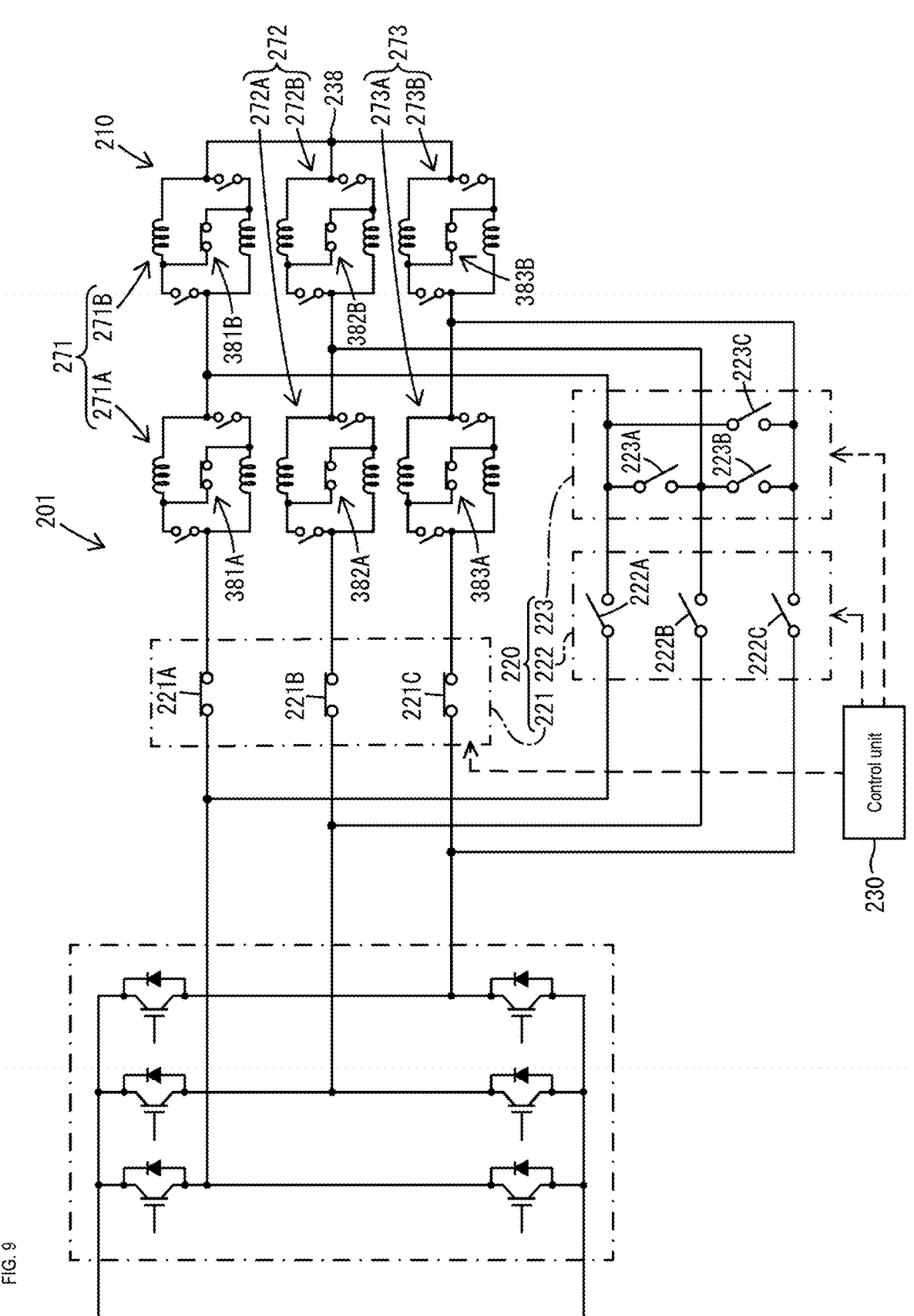
FIG. 9 illustrates a first state of the switching device of FIG. 6.

As shown in FIGS. 8 and 9, the first state is a state in which the first connection state is realized by the connection switching unit 220, and the first coil wire parts 271A, 272A and 273A are connected in series to each other, and the second coil wire parts 271B, 272B, and 273B are connected in series to each other. In the first state, the coil wire parts to be energized are the first coil wire parts 271A, 272A, and 273A, and the second coil wire parts 271B, 272B, and 273B.

Figure 10:
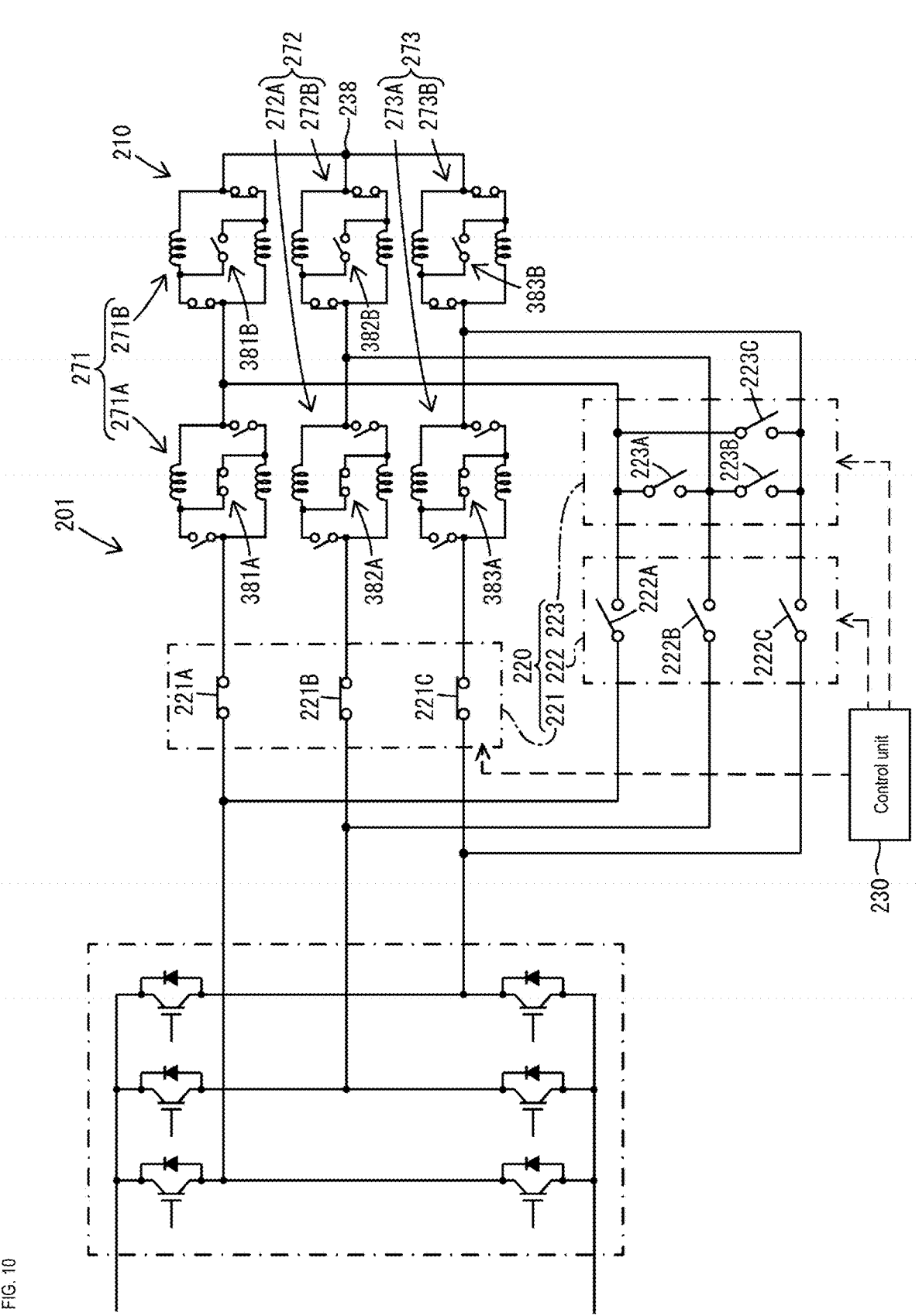
FIG. 10 illustrates a second state of the switching device of FIG. 6.

As shown in FIGS. 8 and 10, the second state is a state in which the first connection state is realized by the connection switching unit 220, and the first coil wire parts 271A, 272A and 273A are connected in series to each other, and the second coil wire parts 271B, 272B, and 273B are connected in parallel to each other. In the second state, the coil wire parts to be energized are the first coil wire parts 271A, 272A, and 273A, and the second coil wire parts 271B, 272B, and 273B.

Figure 11:
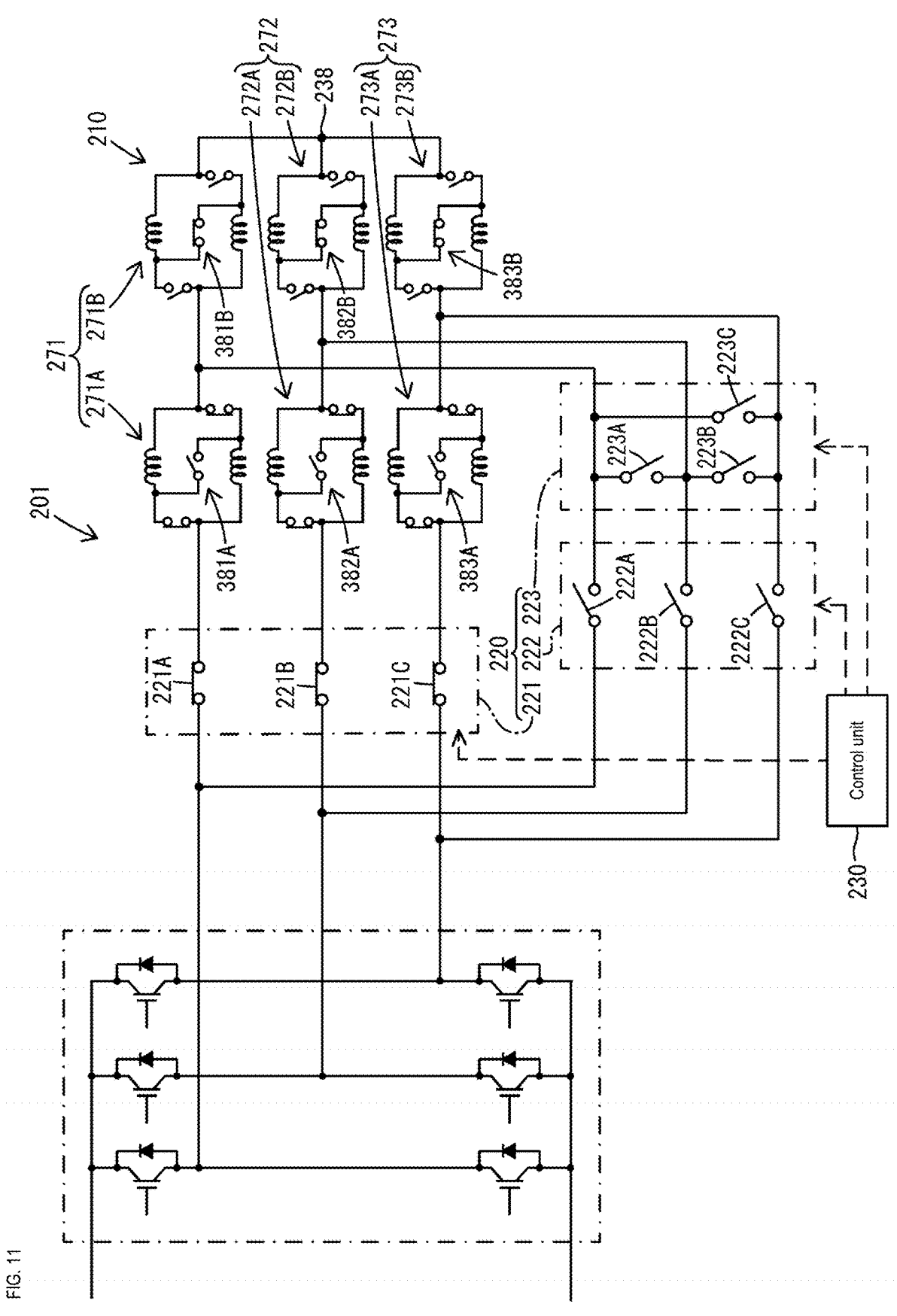
FIG. 11 illustrates a third state of the switching device of FIG. 6.

As shown in FIGS. 8 and 11, the third state is a state in which the first connection state is realized by the connection switching unit 220, and the first coil wire parts 271A, 272A and 273A are connected in parallel to each other, and the second coil wire parts 271B, 272B, and 273B are connected in series to each other. In the third state, the coil wire parts to be energized are the first coil wire parts 271A, 272A, and 273A, and the second coil wire parts 271B, 272B, and 273B.

Figure 12:
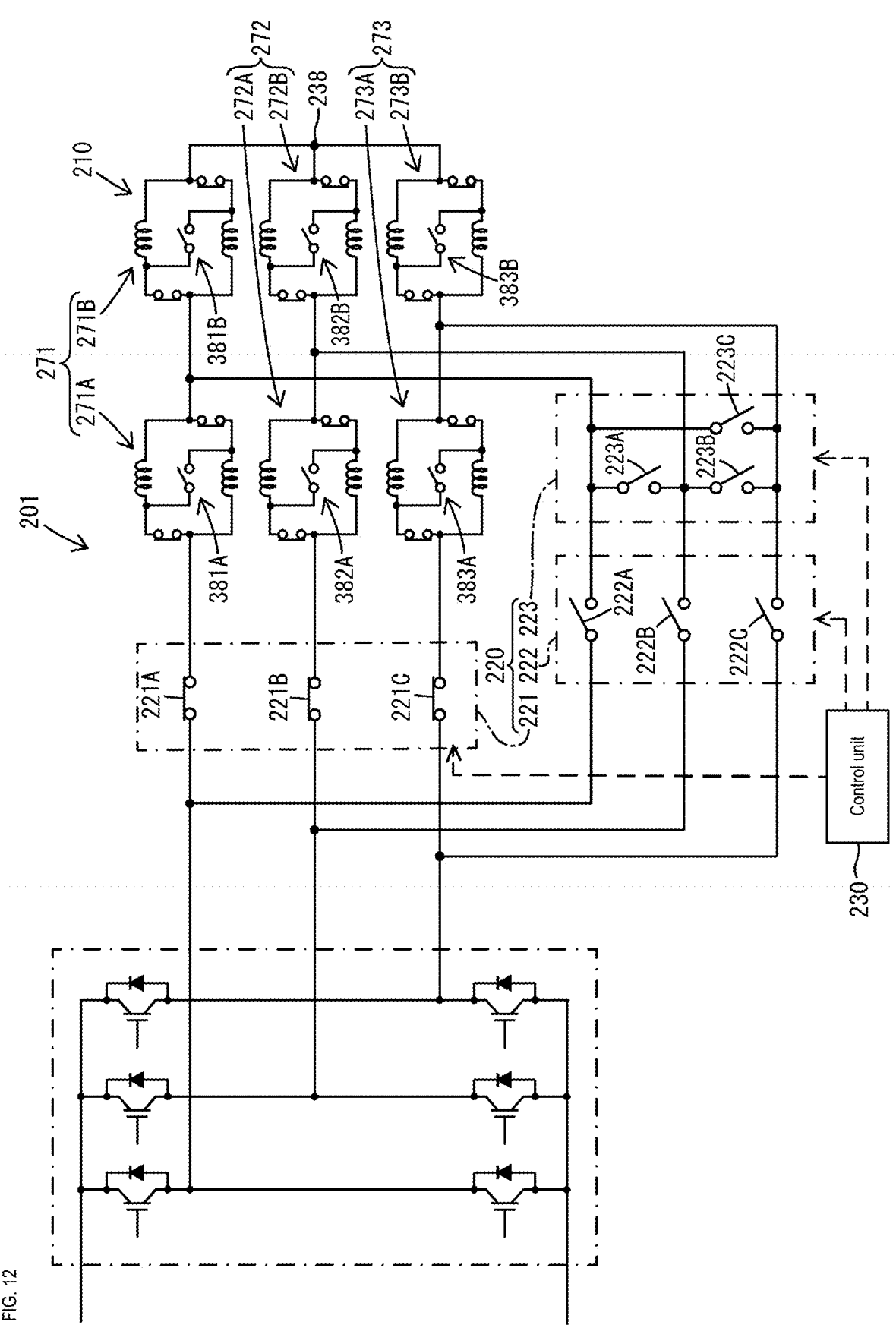
FIG. 12 illustrates a fourth state of the switching device of FIG. 6.

As shown in FIGS. 8 and 12, the fourth state is a state in which the first connection state is realized by the connection switching unit 220, and the first coil wire parts 271A, 272A and 273A are connected in parallel to each other, and the second coil wire parts 271B, 272B, and 273B are connected in parallel to each other. In the fourth state, the coil wire parts to be energized are the first coil wire parts 271A, 272A, and 273A, and the second coil wire parts 271B, 272B, and 273B.

As shown in FIGS. 8 and 13, the fifth state is a state in which the second connection state is realized by the connection switching unit 220, and the first coil wire parts 271A, 272A and 273A are connected in series to each other, and no current flows through the second coil wire parts 271B, 272B, and 273B. In the fifth state, the coil wire parts to be energized are the first coil wire parts 271A, 272A, and 273A. As shown in FIGS. 8 and 14, the sixth state is a state in which the second connection state is realized by the connection switching unit 220, and the first coil wire parts 271A, 272A and 273A are connected in parallel to each other. In the sixth state, the coil wires parts to be energized are the first coil wire parts 271A, 272A, and 273A.

As shown in FIGS. 8 and 15, the seventh state is a state in which the third connection state is realized by the connection switching unit 220, and no current flow through the first coil wire parts 271A, 272A and 273A, and the second coil wire parts 271B, 272B, and 273B are connected in series to each other. In the seventh state, the coil wire parts to be energized are the second coil wire parts 271B, 272B, and 273B. As shown in FIGS. 8 and 16, the eighth state is a state in which the third connection state is realized by the connection switching unit 220, and the second coil wire parts 271B, 272B, and 273B are connected in parallel to each other. In the eighth state, the coil wire parts to be energized are the second coil wire parts 271B, 272B, and 273B.

As shown in FIG. 8, the ninth state is a state in which the fourth connection state is realized by the connection switching unit 220. In the ninth state, no current flows through any of the first coil wire parts 271A, 272A, and 273A and the second coil wire parts 271B, 272B, and 273B.

Example of Effects

Since the second connection state is an operation pattern in which the first coil wire parts of the phase coils 271, 272, and 273 are selectively used and the second coil wire parts are selectively not used, and the third connection state is an operation pattern in which the second coil wire parts of the phase coils 271, 272, and 273 are selectively used and the first coil wire parts are selectively not used, the switching device 201 can generate the operation pattern in which the first coil wire parts are used while suppressing the effects of the second coil wire parts, and the operation pattern in which the second coil wire parts are used while suppressing the effects of the first coil wire parts. Furthermore, since the switching device 201 can also generate an operation pattern in which both the first coil wire parts and the second coil wire parts are used in the first connection state, it is possible to increase the number of operation patterns of the multiphase motor.

Using a simple method of changing the combination of a shorted state and a canceled state of the first connection switching unit 221, the second connection switching unit 222, and the third connection switching unit 223, the switching unit 201 can switch between at least three states (namely the first connection state, the second connection state, and the third connection state).

When the first coil wire parts 271A, 272A, and 273A are connected in series to each other, and the second coil wire parts 271B, 272B, and 273B are connected in series to each other, the switching device 201 can selectively use, in the second connection state, the first coil wire parts 271A, 272A, and 273A whose combined inductance is relatively large, and can thus increase the impedance, making it easy to generate a larger torque. On the other hand, in the third connection state, the switching device 201 can selectively use the second coil wire parts 271B, 272B, and 273B whose combined inductance is relatively small, and thus enhances the suitability for high-speed driving. In the first connection state, the switching device 201 can use not only the first coil wire parts 271A, 272A, and 273A whose combined inductance is relatively large but also the second coil wire parts 271B, 272B, and 273B, and thus makes it easy to further increase the torque.

The same applies to a case where the first coil wire parts 271A, 272A, and 273A are connected in parallel to each other, and the second coil wire parts 271B, 272B, and 273B are connected in parallel to each other.

Figure 17:
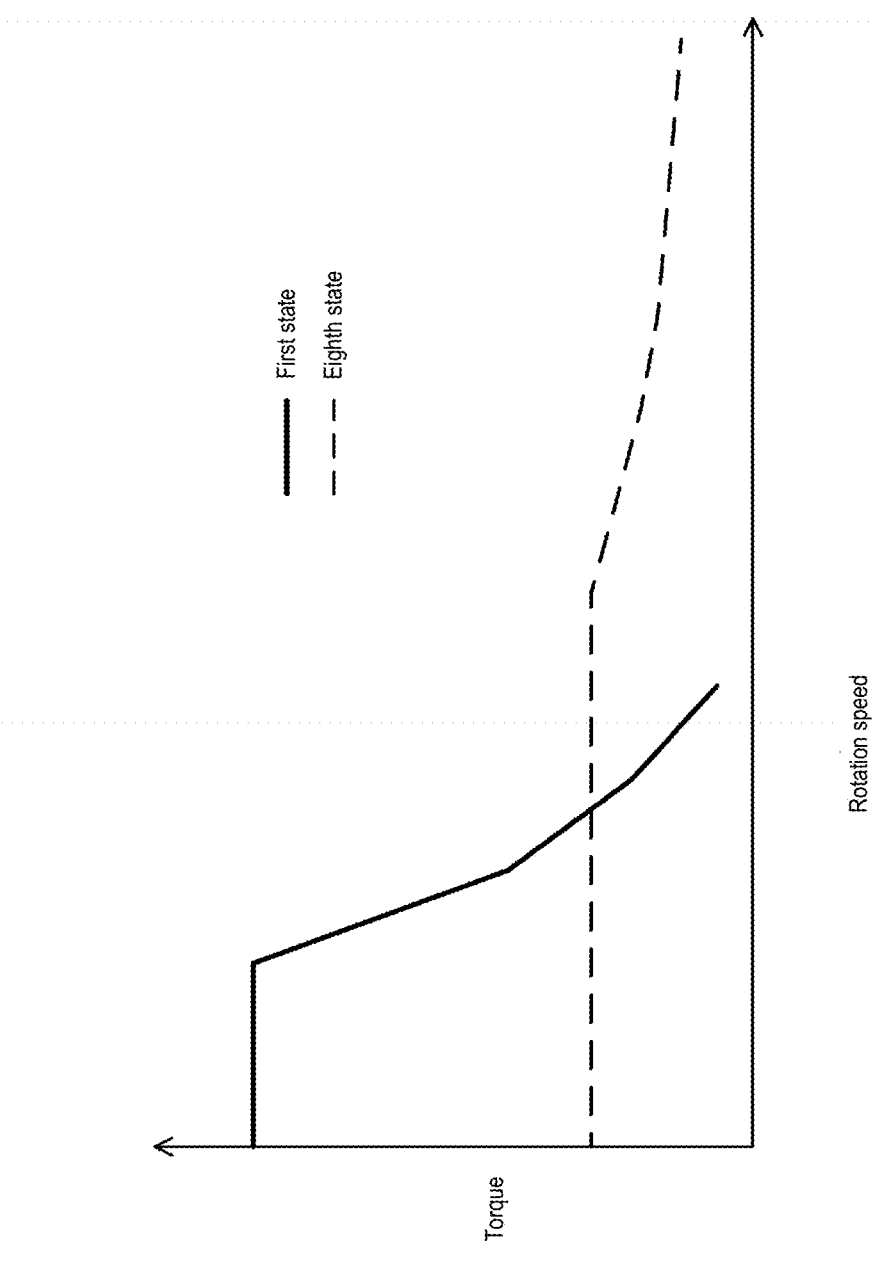
FIG. 17 is a graph illustrating a relationship between the rotation speed and the torque in the first state and the eighth state of a motor to which the switching device of FIG. 6 is applied.

The relationships between the rotation speed and the torque of the motor 10 in the first state and the eighth state are shown in FIG. 17, for example. In examples in FIG. 17, controlling the switching device 201 to switch to the first state while the rotation speed of the vehicle is relatively small is advantageous when a high torque is required at a low rotation speed, such as when the vehicle starts driving or is climbing. Also, operating the switching device 201 to switch to the eighth state while the rotation speed of the vehicle is relatively large is advantageous when the vehicle does not frequently accelerate and decelerate but maintains a high speed, such as when the vehicle travels on a highway. Also, operating the switching device 201 to switch to the second state, the third state, the fourth state, the fifth state, the sixth state, and the seventh state while the rotation speed of the vehicle is moderate is advantageous when the vehicle accelerates and decelerates in a range of a moderate speed or changes the road, such as when the vehicle travels in an urban area.

OTHER EMBODIMENTS

The present disclosure is not limited to the embodiments described with reference to the above-described specification and the drawings. For example, any combination of features of the above-described or later-described embodiments is possible to the extent that they are not inconsistent with each other. Also, any feature of the above-described or later-described embodiments can be omitted as long as it is not explicitly essential. Furthermore, the above-described embodiments may be modified as follows.

In the first embodiment, the first relays 81A, 81B, and 81C of the first switching unit 81 are configured as semiconductor relays, but they may also be configured as mechanical relays. A mechanical relay is configured, for example, to open and close a mechanical contact when a current flows through an excitation coil. Similarly the second relays 82A, 82B, and 82C of the second switching unit 82 and the third relays 83A, 83B, and 83C of the third switching unit 83 may also be configured as mechanical relays. With such a configuration, the first switching unit 81, the second switching unit 82, and the third switching unit 83 can achieve a reduction in loss due to resistance compared to a case where they are configured as semiconductor relays.

In the first embodiment, an example has been given in which the first phase (U-phase) coil, the second phase (V-phase) coil, and the third phase (W-phase) coil are each constituted by two coil parts, but a configuration is also possible in which the number of the coil parts constituting the phase coils is other than two.

In the first embodiment, the protruding portion 75 and the fixation portion 76 of the holding unit 70 are separate members, but a configuration is also possible in which they are molded as one piece and are inseparable.

In the first embodiment, the signal terminal 51 held by the socket 77 is given as an example of a signal terminal held by the holding unit 70, but a terminal (an end of a signal line of the sensor connector 28) held by the output-side connection part 28B of the sensor connector 28 may also be included.

In the first embodiment, the one end 61 of the lead of the thermistor 60 is in contact with the conductive part 43C of the third phase (W-phase), but a configuration is also possible in which the one end 61 is in contact with another conductive part.

In the second embodiment, the switching device 201 includes the control unit 230, but it is not essential that the switching device includes the control unit 230. For example, a configuration is also possible in which the switching device is constituted only by the above-described series/parallel switching unit 210 and connection switching unit 220, and the switching device (specifically, the series/parallel switching unit 210 and the connection switching unit 220) performs switching operation in response to an instruction from an external device (for example, a device having the same function as the above-described control unit 230).

Figure 18:
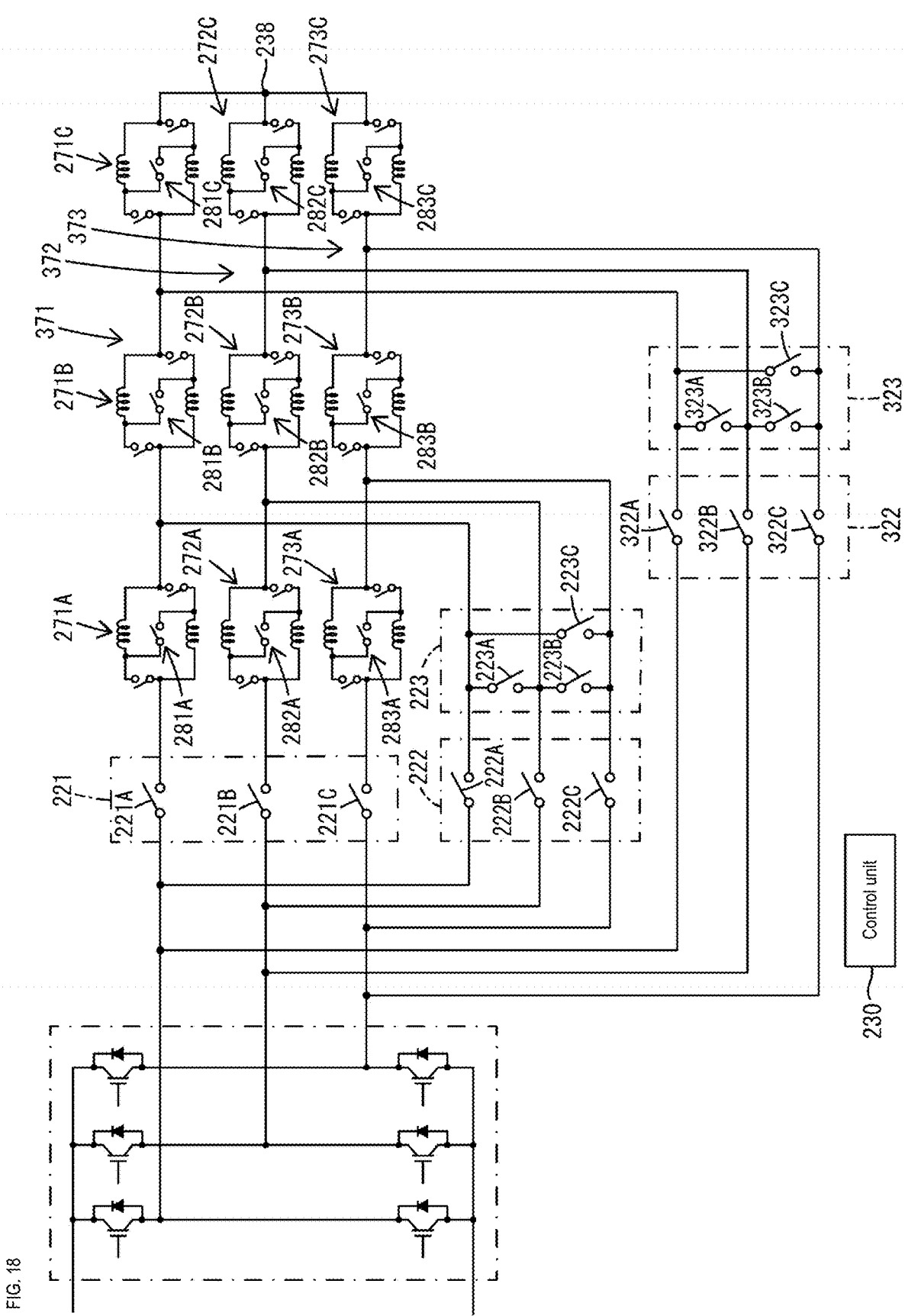
FIG. 18 is a circuit diagram schematically illustrating an example of coils, switching devices, and an inverter according to another embodiment.

In the second embodiment, each phase coil includes two coil wire parts, but the phase coils may also include three or more coil wire parts. For example, as the U-phase coil 371, the V-phase coil 372, and the W-phase coil 373 shown in FIG. 18, the third coil wire parts 271C, 272C, and 273C may be provided between the respective second coil wire parts 271B, 272B, and 273B, and the short-circuit part 238. In this example, as shown in FIG. 18, it is sufficient that the fourth connection switching unit 322, which switches the switches 322A, 322B, and 322C between on and off, and the fifth connection switching unit 323, which switches the switches 323A, 323B, and 323C between on and off, are provided. In the example shown in FIG. 18, in order to realize the above-described first connection state, it is sufficient to, in addition to the control for the first connection state in the first embodiment, turn all of the switches 322A, 322B, and 322C off, and turn all of the switches 323A, 323B, and 323C on. In order to realize the second connection state, it is sufficient to, in addition to the control for the second connection state in the first embodiment, turn all of the switches 322A, 322B, 322C, 323A, 323B, and 323C off. In order to realize the third connection state, it is sufficient to, in addition to the control for the third connection state in the first embodiment, turn all of the switches 322A, 322B, and 322C off, and turn all of the switches 323A, 323B, and 323C on. In order to realize the fourth connection state, it is sufficient to, in addition to the control for the fourth connection state in the first embodiment, turn all of the switches 322A, 322B, 322C, 323A, 323B, and 323C off. Furthermore, when all of the connection switching units 221, 222, 223, and 323 are turned off, and the fourth connection switching unit 322 is turned on, it is possible to achieve the fourth connection state such as a state in which the third coil wire parts 371C, 372C, and 373C are selectively used, without using the first coil wire part and the second coil wire part. When all of the connection switching units 222, 223, 322, and 323 are turned off, and the first connection switching unit 221 is turned on, it is possible to achieve the fifth connection state such as a state in which all of the first coil wire parts, the second coil wire parts, and the third coil wire parts are used. Furthermore, it is possible to create other connection states. As shown in FIG. 18, the series/parallel switching unit 210 is provided with the first switching unit 381C, the second switching unit 382C, and the third switching unit 383C, which have the same configuration as the first switching unit 381A. Based on the control of the control unit 230, the first switching unit 381C, the second switching unit 382C, the third switching unit 383C can respectively switch the third coil wire parts 271C, 272C, and 273C between a series connection and a parallel connection.

In the second embodiment, one of the first coil wire part or the second coil wire part of each of the phase coils 271, 272, and 273 may be constituted by a single coil part.

In the second embodiment, an example has been given in which the first phase (U-phase) coil, the second phase (V-phase) coil, and the third phase (W-phase) coil are each constituted by two coil parts, but a configuration is also possible in which each phase coil is constituted by three or more coil parts that can be switched between a series connection and a parallel connection.

Note that the embodiments disclosed herein are examples in all respects, and should be construed as non-limiting. The scope of the present disclosure is not limited to the embodiments disclosed herein, but is intended to include all modifications within the scope of the claims and equivalent to the scope of the claims.

The invention claimed is:

1. A multi-phase motor switching device for use in a multi-phase motor provided with multi-phase coils, the multi-phase coils each including a plurality of coil parts, the multi-phase motor switching device comprising:

a switching unit configured to switch at least some of the plurality of coil parts of each of the multi-phase coils between a series connection and a parallel connection;

wherein the multi-phase coils each include a plurality of coil wire parts, the multi-phase motor switching device further comprises a connection switching unit configured to switch a connection state of the plurality of coil wire parts of each multi-phase coil, the coil wire parts of each multi-phase coil include a first coil wire part and a second coil wire part, and the connection switching unit is switched between a first connection state in which current flow control of the first coil wire part and the second coil wire part of the multi-phase coil is possible, a second connection state in which current flow control of the first coil wire part of the multi-phase coil is possible and current flow control of the second coil wire part of the multi-phase coil is interrupted, and a third connection state in which current flow control of the second coil wire part of the multi-phase coil is possible and current flow control of the first coil wire part of the multi-phase coil is interrupted.

2. The multi-phase motor switching device according to claim 1, wherein the multi-phase coils include a first-phase coil, a second-phase coil, and a third-phase coil, and the switching unit includes:

a first switching unit configured to switch a plurality of first coil parts constituting the first-phase coil between a series connection and a parallel connection;

a second switching unit configured to switch a plurality of second coil parts constituting the second-phase coil between a series connection and a parallel connection;

a third switching unit configured to switch a plurality of third coil parts constituting the third-phase coil between a series connection and a parallel connection.

3. The multi-phase motor switching device according to claim 2, further including, a holding unit that holds the first switching unit, the second switching unit, and the third switching unit, wherein the holding unit is configured to be fixed to a stator unit of the multi-phase motor.

4. The multi-phase motor switching device according to claim 2, wherein the first switching unit includes a plurality of first relays, and is configured to turn the plurality of first relays on and off to switch the plurality of first coil parts between a series connection and a parallel connection;

the second switching unit includes a plurality of second relays, and is configured to turn the plurality of second relays on and off to switch the plurality of second coil parts between a series connection and a parallel connection;

the third switching unit includes a plurality of third relays, and is configured to turn the plurality of third relays on and off to switch the plurality of third coil parts between a series connection and a parallel connection; and the first relays, the second relays, and the third relays are configured as semiconductor relays.

5. The multi-phase motor switching device according to claim 2, wherein the first switching unit includes a plurality of first relays, and is configured to turn the plurality of first relays on and off to switch the plurality of first coil parts between a series connection and a parallel connection;

the second switching unit includes a plurality of second relays, and is configured to turn the plurality of second relays on and off to switch the plurality of second coil parts between a series connection and a parallel connection;

the third switching unit includes a plurality of third relays, and is configured to turn the plurality of third relays on and off to switch the plurality of third coil parts between a series connection and a parallel connection; and the first relays, the second relays, and the third relays are configured as mechanical relays.

6. The multi-phase motor switching device according to claim 2, further including, a terminal holding unit that holds a plurality of power terminals respectively electrically connected to the first-phase coil, the second-phase coil, and the third-phase coil, the terminal holding unit containing an insulating material, wherein the first switching unit, the second switching unit, the third switching unit, and the terminal holding unit are formed as one piece.

7. The multi-phase motor switching device according to claim 6, wherein the multi-phase motor switching device is used in the multi-phase motor in which a stator core, the first-phase coil, the second-phase coil, and the third-phase coil are provided in the stator unit, the multi-phase motor switching device further comprises a cover part containing an insulating material, the cover part being configured to cover and hold together a plurality of coil ends of the first-phase coil, the second-phase coil, and the third-phase coil that protrude from an end of the stator core, and defining a positional relationship between the coil ends, and the cover part, the first switching unit, the second switching unit, the third switching unit, and the terminal holding unit are formed as one piece.

8. The multi-phase motor switching device according to claim 1, further including, a control unit configured to control the connection switching unit, wherein the multi-phase coils include a first-phase coil, a second-phase coil, and a third-phase coil, the connection switching unit includes a first connection switching unit configured to be switched between a first shorted state and a first canceled state, a second connection switching unit configured to be switched between a second shorted state and a second canceled state, and a third connection switching unit configured to be switched between a third shorted state and a third canceled state, the first shorted state is a state in which a first end, which is one end of the first coil wire part of the first-phase coil, and a first conductive path are shorted, a second end, which is one end of the first coil wire part of the second-phase coil, and a second conductive path are shorted, and a third end, which is one end of the first coil wire part of the third-phase coil, and a third conductive path are shorted, the first canceled state is a state in which a short-circuit between the first end and the first conductive path is canceled, a short-circuit between the second end and the second conductive path is canceled, and a short-circuit between the third end and the third conductive path is canceled, the second shorted state is a state in which a fourth end, which is one end of the second coil wire part of the first-phase coil, and the first conductive path are shorted, a fifth end, which is one end of the second coil wire part of the second-phase coil, and the second conductive path are shorted, and a sixth end, which is one end of the second coil wire part of the third-phase coil, and the third conductive path are shorted, the second canceled state is a state in which a short-circuit between the fourth end and the first conductive path is canceled, a short-circuit between the fifth end and the second conductive path is canceled, and a short-circuit between the sixth end and the third conductive path is canceled, the third shorted state is a state in which ends of another end group are shorted to each other, the other end group including another end of the first coil wire part of the first-phase coil, another end of the first coil wire part of the second-phase coil, and another end of the first coil wire part of the third-phase coil, the third canceled state is a state in which short-circuits between the ends of the other end group are canceled, and the control unit controls the connection switching unit to be in the first connection state by bringing the first connection switching unit into the first shorted state, the second connection switching unit into the second canceled state, and the third connection switching unit into the third canceled state, controls the connection switching unit to be in the second connection state by bringing the first connection switching unit into the first shorted state, the second connection switching unit into the second canceled state, and the third connection switching unit into the third shorted state, and controls the connection switching unit to be in the third connection state by bringing the first connection switching unit into the first canceled state, the second connection switching unit into the second shorted state, and the third connection switching unit into the third canceled state.

9. The multi-phase motor switching device according to claim 1, wherein the first coil wire part and the second coil wire part of each of the multi-phase coils is constituted by the plurality of coil parts, the switching unit is configured to switch the plurality of coil parts constituting the first coil wire part between a series connection and a parallel connection, and switch the plurality of coil parts constituting the second coil wire part between a series connection and a parallel connection, in each of the multi-phase coils, when the plurality of coil parts constituting the first coil wire part are switched by the switching unit to a series connection, and the plurality of coil parts constituting the second coil wire part are switched by the switching unit to a series connection, a combined inductance of the first coil wire part is greater than a combined inductance of the second coil wire part, and in each of the multi-phase coils, when the plurality of coil parts constituting the first coil wire part are switched to a parallel connection, and the plurality of coil parts constituting the second coil wire part are switched to a parallel connection, a combined inductance of the first coil wire part is greater than a combined inductance of the second coil wire part.

10. A multi-phase motor comprising the multi-phase motor switching device according to claim 1.

11. The multi-phase motor switching device according to claim 3, wherein the first switching unit includes a plurality of first relays, and is configured to turn the plurality of first relays on and off to switch the plurality of first coil parts between a series connection and a parallel connection;

the second switching unit includes a plurality of second relays, and is configured to turn the plurality of second relays on and off to switch the plurality of second coil parts between a series connection and a parallel connection;

the third switching unit includes a plurality of third relays, and is configured to turn the plurality of third relays on and off to switch the plurality of third coil parts between a series connection and a parallel connection; and the first relays, the second relays, and the third relays are configured as semiconductor relays.

12. The multi-phase motor switching device according to claim 3, wherein the first switching unit includes a plurality of first relays, and is configured to turn the plurality of first relays on and off to switch the plurality of first coil parts between a series connection and a parallel connection;

the second switching unit includes a plurality of second relays, and is configured to turn the plurality of second relays on and off to switch the plurality of second coil parts between a series connection and a parallel connection;

the third switching unit includes a plurality of third relays, and is configured to turn the plurality of third relays on and off to switch the plurality of third coil parts between a series connection and a parallel connection; and the first relays, the second relays, and the third relays are configured as mechanical relays.

13. The multi-phase motor switching device according to claim 3, further including, a terminal holding unit that holds a plurality of power terminals respectively electrically connected to the first-phase coil, the second-phase coil, and the third-phase coil, the terminal holding unit containing an insulating material, wherein the first switching unit, the second switching unit, the third switching unit, and the terminal holding unit are formed as one piece.

14. A multi-phase motor comprising the multi-phase motor switching device according to claim 2.

15. A multi-phase motor comprising the multi-phase motor switching device according to claim 3.

* * * * *